(12) United States Patent
Buer et al.

(10) Patent No.: US 8,166,296 B2
(45) Date of Patent: Apr. 24, 2012

(54) USER AUTHENTICATION SYSTEM

(75) Inventors: Mark Buer, Gilbert, AZ (US); Ed Frank, Atherton, CA (US); Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1536 days.

(21) Appl. No.: 11/197,815

(22) Filed: Aug. 5, 2005

(65) Prior Publication Data

US 2006/0085844 A1 Apr. 20, 2006

Related U.S. Application Data

(60) Provisional application No. 60/620,645, filed on Oct. 20, 2004.

(51) Int. Cl.
*H04L 9/32* (2006.01)

(52) U.S. Cl. ............................................. 713/168; 726/5

(58) Field of Classification Search .................. 726/2–5, 726/21, 27–30; 713/168, 182–185; 380/255, 380/270; 455/411
See application file for complete search history.

(56) References Cited

U.S. PATENT DOCUMENTS

| | | | |
|---|---|---|---|
| 6,453,159 B1 | 9/2002 | Lewis | |
| 6,490,367 B1 | 12/2002 | Carlsson et al. | |
| 6,525,955 B1 | 2/2003 | Smith et al. | |
| 6,693,819 B2 | 2/2004 | Smith et al. | |
| 6,700,176 B2 | 3/2004 | Ito et al. | |
| 6,704,236 B2 | 3/2004 | Buer et al. | |
| 7,069,516 B2 | 6/2006 | Rekimoto | |
| 7,085,854 B2* | 8/2006 | Keane et al. | 709/250 |
| 2002/0019944 A1* | 2/2002 | Kou | 713/171 |
| 2002/0023210 A1* | 2/2002 | Tuomenoksa et al. | 713/161 |
| 2004/0103275 A1 | 5/2004 | Ji et al. | |
| 2005/0105734 A1 | 5/2005 | Buer et al. | |
| 2006/0072762 A1 | 4/2006 | Buer | |
| 2007/0055877 A1* | 3/2007 | Persson et al. | 713/171 |

FOREIGN PATENT DOCUMENTS

| | | |
|---|---|---|
| EP | 0 957 651 A2 | 11/1999 |
| EP | 1 263 164 A1 | 12/2002 |

OTHER PUBLICATIONS

Search Report and Opinion for European Application No. EP05020598.8-2413 mailed Jun. 22, 2006, 11 pgs.
Examination for European Application No. EP05020598.8-2413 mailed Aug. 31, 2009, 2 pgs.

\* cited by examiner

*Primary Examiner* — Gilberto Barron, Jr.
*Assistant Examiner* — Abdulhakim Nobahar
(74) *Attorney, Agent, or Firm* — Sterne, Kessler, Goldstein & Fox PLLC

(57) ABSTRACT

Techniques are provided for users to authenticate themselves to components in a system. The users may securely and efficiently enter credentials into the components. These credentials may be provided to a server in the system with strong authentication that the credentials originate from secure components. The server may then automatically build a network by securely distributing keys to each secure component to which a user presented credentials.

22 Claims, 12 Drawing Sheets

USER AUTHENTICATION SYSTEM

CROSS-REFERENCE TO RELATED APPLICATION(S)

This application claims the benefit of U.S. Provisional Patent Application No. 60/620,645, filed Oct. 20, 2004, the disclosure of which is hereby incorporated by reference herein.

TECHNICAL FIELD

This application relates to data communication systems and, more specifically, to a system and method for authenticating a user or users to use one or more devices in a communication system.

BACKGROUND

A variety of services may be accessed using computing devices such as personal computers and wireless handsets. For example, a user may access data stored on or applications running on the computing device. In addition, a user may connect to a data network to gain access to data and applications on remote servers.

In some cases, access to a service may be limited to authorized users. For example, a service may provide access to sensitive data such as financial information or personal information. In addition, access to a service may require payment of a fee.

A variety of techniques are known for securing access to services via a computing device. For example, a user may be required to present some form of credential to a computing device that provides the service (the "service provider"). Here, the credential may indicate that a particular user (or anyone who knows the credential) may access a given service. In some applications a credential may take the form of a user name and password that was provided to the user and the service provider by a system administrator. When the user accesses a service, the user may present the user name and password to the service provider. The service provider then verifies that this credential is assigned to an authorized user of the requested service.

In a typical data network, access to the data network is limited to devices that have been properly installed on the network. As part of this installation, cryptographic techniques may be employed to ensure that only authorized devices are connected to the network. In general, cryptographic techniques may include one or more of encryption, decryption, authentication, signing and verification.

For example, a network administrator may load one or more cryptographic keys (hereafter "key(s)") into each device that is authorized to connect to the network. The network administrator also loads corresponding keys into a network access device (e.g., a router) that is connected to, for example, a wide area network ("WAN"). When the device attempts to access the network, the network access device verifies that a proper key has been loaded into that device. Once verified, the network access device enables the requesting device access to the network.

In practice, the process of authorizing a user to use a service and installing devices on a network may be relatively cumbersome and time consuming. As described above, these operations tend to be relatively manual in nature. However, distributed computing services are becoming increasingly prevalent and affordable to access. For example, the proliferation of wireless computing networks and handheld devices enables a user to use a variety of devices to access a variety of different networks that may exist throughout a city, etc. Accordingly, a need exists for more efficient techniques for enabling a user to access secured services.

Moreover, conventional methods of entering or loading a credential or a cryptographic key into a device may be compromised in some circumstances. For example, when a user uses a computing device to access a secured service, the user may first need to enter the credential into the computing device. Typically, this is accomplished using an input device such as a keyboard. The computing device may then forward these credentials to a service provider that determines whether the user is authorized to use the requested service.

In the event the computing device has been comprised by a hacker or a computer virus, an unauthorized person may gain access to these credentials. For example, a personal computer may incorporate a trusted computing module ("TPM") to control access to certain secured services (e.g., access to an encrypted data file or a secured network). Here, the TPM may require a user to enter a password or other credential before the TPM allows the user to access these services. If the user uses a keyboard to enter this information, the password may be routed through the personal computer from the keyboard to the TPM via an unsecured path. For example, the keyboard may connect to a USB port and a software driver may be used to transfer the data from the USB bus to a TPM that, for example, is connected to a South Bridge of the personal computer. However, the hacker or virus may be able to access data that is forwarded and/or stored by the software driver. As a result, an unauthorized person may acquire the password and gain access to the secured service.

Similarly, secret key information used in wireless devices may be compromised. For example, to enable secure communication between two Bluetooth devices, complementary keys may need to be loaded into each device. In some applications, a key is transferred from one Bluetooth device to the other Bluetooth device via the Bluetooth network. However, an unauthorized person may be able to intercept the broadcast Bluetooth signal containing the key. As a result an unauthorized person may acquire the key and gain access to secured services.

Serious consequences may result when the secured services control and provide access to sensitive information such as financial data or personal information. Accordingly, a need exists for more secure techniques for providing access to secured services.

SUMMARY

The invention relates to a system and method for authenticating a user or users to use one or more devices in a communication system. For convenience, an embodiment of a system constructed or a method practiced according to the invention may be referred to herein simply as an "embodiment."

In one aspect the invention relates to authenticating a user to access a service provided by or accessible via an access device (e.g., a computing device). For example, the user may access data stored on the access device or on a remote computing device. The user also may access applications running on the access device or on remote servers. In addition the user may gain access to a data network via the access device.

In some embodiments, a secure communication mechanism may be established between the access device and a service provider. For example, a user may initially provide the credentials to the access device in a secure manner. In some embodiments this may include entering the credentials into a security boundary in the access device. A cryptographic processing component in the access device may then cryptographically encrypt and/or sign the credentials within the security boundary. Here, the authenticity of the signing/encrypting may be verified to third parities (e.g., a service provider) by a published digital certificate. The access device then provides the signed/encrypted credentials to a service provider.

The service provider may validate that the credentials originate from a specific access device. For example, a cryptographic processor in the service provider may use the access device's public key to cause the access device to prove that it has the corresponding private key. In addition, since the service provider has access to a certificate for the public key, assurance may be provided that the access device has a mechanism for protecting keys and that the private key of the access device was not exposed outside of the security boundary. Consequently, a high level of assurance that the credentials came from a specific and/or trusted access device may be provided to the service provider.

In some embodiments, authentication of credentials from a user may be used to automatically build a network for the user. For example, the user may provide his or her credentials to an access device that the user wishes to use to connect to the network. These credentials may then be provided to an access server that is capable of establishing secure communications with the access device. Since the credentials may be authenticated as discussed above, for example, the access server may be assured that the keys necessary for establishing secure communication with the access device may be securely sent to that access device. For example, the credentials may serve to verify that the access device is the specific device it purports to be and that the key information may be securely sent to, used by and stored in the access device.

The user may initiate connecting additional access devices to the network by presenting his or her credentials to the access device. In this case, after receiving the appropriate authentication information (e.g., signed credentials) from each access device and verifying the certificates of the access devices, the access server provides the key associated with that user to each of these access devices as discussed above. Accordingly, a user may easily connect access devices to the network. Moreover, this may be accomplished in a very secure manner.

Any number of users may form their own network of access devices using the same or other access devices. Here, each unique user will be assigned a unique key or keys that are distributed to that user's access devices. As a result, each user's network will be cryptographically separated from the other user's network.

In some embodiments an input device is incorporated into a security boundary with a cryptographic processing component to enable a user to securely enter credentials into an access device. For example, these components may be connected so that data sent between the components is not routed through an insecure medium such as a data memory, a software stack or radio transmissions that may be compromised by unauthorized persons, devices or processes. In some applications this may be accomplished by incorporating the components into the same integrated circuit (i.e., chip).

In this way, the data from the input device may be securely provided to a security boundary in the access device where the data may then be encrypted. As a result, the data may never be presented in the clear (e.g., unencrypted) in an unsecured path outside of the security boundary (e.g., as provided by the physical boundary of the chip).

In some embodiments authentication may be used to verify that a user is in the proximity of the access device. For example, an authorized user may be provided access to a service only when a wireless token assigned to the user is in the proximity of the access device through which access to the secured service is obtained. In this way, a reasonable assumption may be made that the authorized user is in fact using a specific access device to request the service.

In some embodiments a user's credentials are stored on an RFID token and an RFID reader is implemented within a security boundary on the access device. In this way, the credential may be passed to the security boundary without passing through the access device via software messages or applications. As a result, the credentials may not be intercepted by a hacker or computer virus that may have compromised the software executing on the access system.

In some embodiments the input device may comprise a biometric sensor such as a fingerprint reader. In this case, the credentials may include biometric information (e.g., a scan of a fingerprint).

In some embodiments a system constructed in accordance with the invention comprises a wired and/or wireless network where access devices include an RFID reader and cryptographic processing within a security boundary. A user may access the network using any of these devices by placing his or her RFID token in proximity to the access device. This causes the credentials to be securely sent to the access server for the network. The access server then provides the keys associated with that user to each device to which the user provided his or her credentials. In this way the user may be automatically authenticated to access the network using any of these devices.

BRIEF DESCRIPTION OF THE DRAWINGS

These and other features, aspects and advantages of the present invention will be more fully understood when considered with respect to the following detailed description, appended claims and accompanying drawings, wherein:

Figure 1:
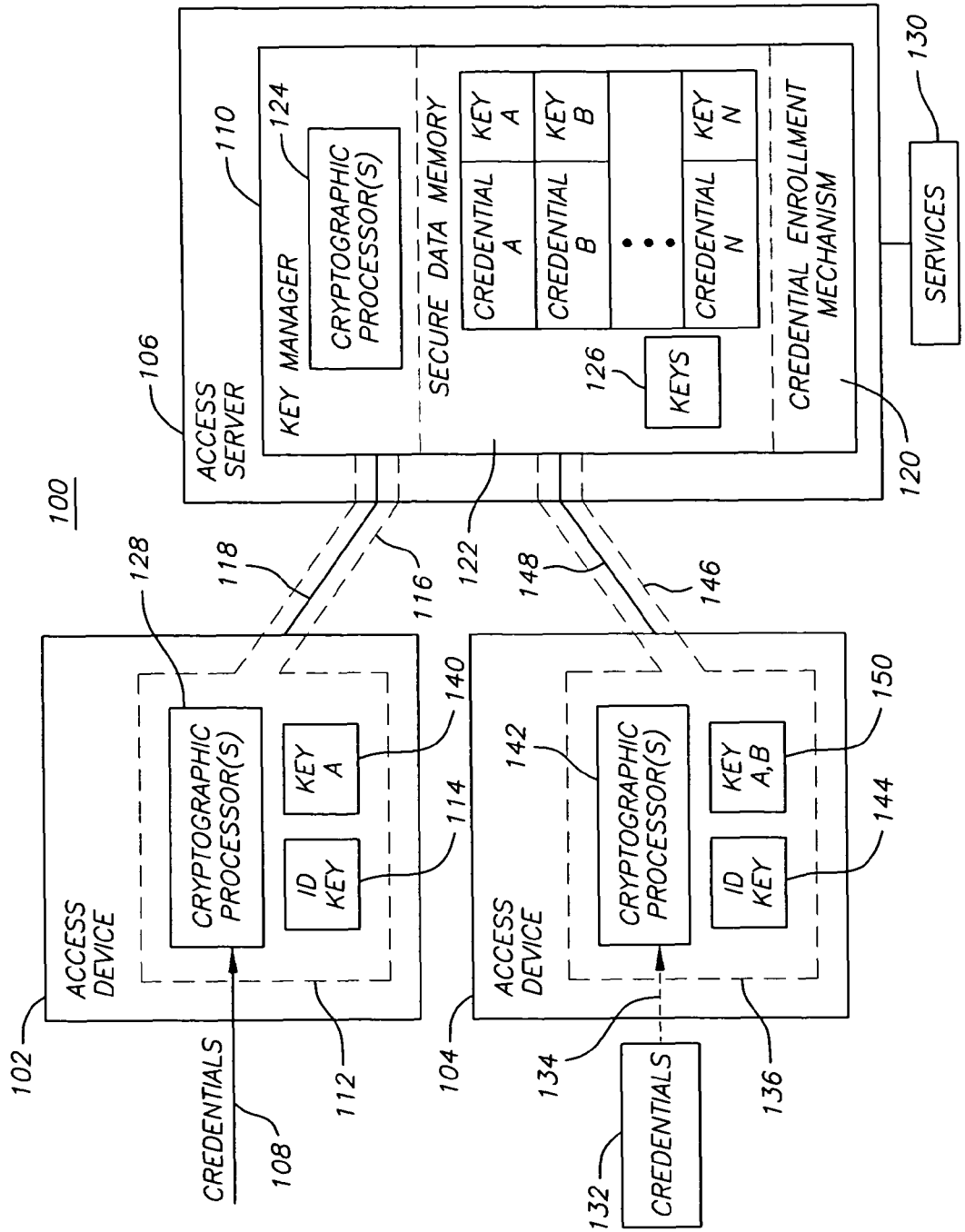
FIG. 1 is a simplified block diagram of one embodiment of a user authentication system constructed in accordance with the invention.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals denote like features throughout the specification and figures.

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention.

In one aspect, the invention relates to systems and methods that provide user level authentication. For example, various techniques are described for authenticating a user to a device. In addition, various techniques are described for authenticating a user to a service such as enabling access to a data network.

In a conventional data network device level authentication may be used to ensure that only authorized devices are allowed to connect to the network. Here, cryptographic techniques may be employed to authenticate that a device that is attempting to connect to the network is the device it purports to be and is authorized to use the network. For example, a device typically connects to the network via an access point such as a router. Compatible cryptographic keys are thus provided to the router and to authorized devices to enable these devices to perform cryptographic operations that provide the desired authentication. In such a network, a mechanism must be provided for securely distributing keys to all devices that may connect to the network. Traditionally, this has been accomplished by the user or a network administrator manually loading the keys into the devices (e.g., via a keyboard or a software program).

Such device level authentication may have a number of drawbacks. For example, there may not be any verification as to which user is using the device. Moreover, when multiple users use the same device, there may not be an efficient mechanism to determine which verification information (e.g., cryptographic certificate) should be used to authenticate to the system.

FIG. 1 illustrates one embodiment of a system 100 constructed in accordance with the invention where one or more users (not shown) may use one or more access devices 102 and 104 to access services 130 (e.g., connect to a data network) via an access server 106. For example, to access a service a user presents authentication information (e.g., credentials 108 such as a password) to the access device 102. For convenience the term "credential(s)" may be used to refer generally to any type of information that a user may present for authentication purposes.

The access device 102 may include a security module that provides cryptographic processing and may incorporate other security mechanisms. For example, a security module may include one or more cryptographic processors 128 that perform cryptographic operations such as encryption, decryption, authentication, verification and signing. Using the security module, the access device 102 may authenticate the credentials received from the user and securely send the credentials to a key manager 110 in the access server 106.

The key manager 110 provides a secure environment for generating, assigning and maintaining keys that are used in the system. The key manager includes one or more cryptographic processors 124 for securely performing cryptographic operations including encryption, decryption, authentication, etc. The key manager also includes a secure data memory 122 for storing keys 126 in a manner that prevents the keys from being accessed by unauthorized persons or methods.

To provide secure processing and key storage a security boundary is associated with and enforced by the key manager. This security boundary may be established, for example, using hardware and/or cryptographic techniques.

Hardware techniques for providing a security boundary may include, for example, placing components within a single integrated circuit. In addition, one or more integrated circuits may be protected by a physical structure using tamper evident and/or tamper resistant techniques such as epoxy encapsulation.

Encryption techniques for establishing a security boundary may include, for example, encrypting any sensitive information before it leaves the key manager. For this purpose, the key manager may use one or more of the cryptographic processors 124 and store the associated encryption/decryption keys 126 in an internal secure data memory 122.

To maintain the security of the system 100, any keys distributed by the key manager to other components in the system should be adequately protected. For example, provisions may be made to ensure that keys are only delivered to authorized devices. In addition, provisions may be made to protect the keys during distribution and within the recipient devices.

In some embodiments the access device 102 includes one or more cryptographic processors 128 and keys (e.g., key 114) to authenticate information that is sent from the access device 102 to the access server 106, to facilitate secure transmission of keys to the access device 102, and to protect the keys used by the access device 102.

For example, using digital certificates and other cryptographic processes the access device 102 may provide strong authentication to the access server 106 that the credentials it sends to the access server 106 are from a user that is using that specific access device. In addition, these processes may be used to verify that the access device 102 provides a high level of protection for key material.

Once this authentication is provided to the access server 106, the key manager 110 may safely distribute keys to the access device 102 to facilitate access to the desired service. For example, the key manager may distribute keys to the access device to enable the access device to connect to a data network.

The embodiment of FIG. 1 provides an efficient mechanism that enables a user to, for example, use a variety of access devices to gain access to a network. Here, the user initially authenticates himself or herself to each device. The access server then automatically builds the network by distributing the necessary keys to each device. As described herein this process may be accomplished with a high level of security. Moreover, since the access server provides the appropriate keys to each device, the key material does not need to be given to the user. In addition, the user may not be required to, for example, provide a digital certificate to each access device he or she uses in the network.

Figure 2:
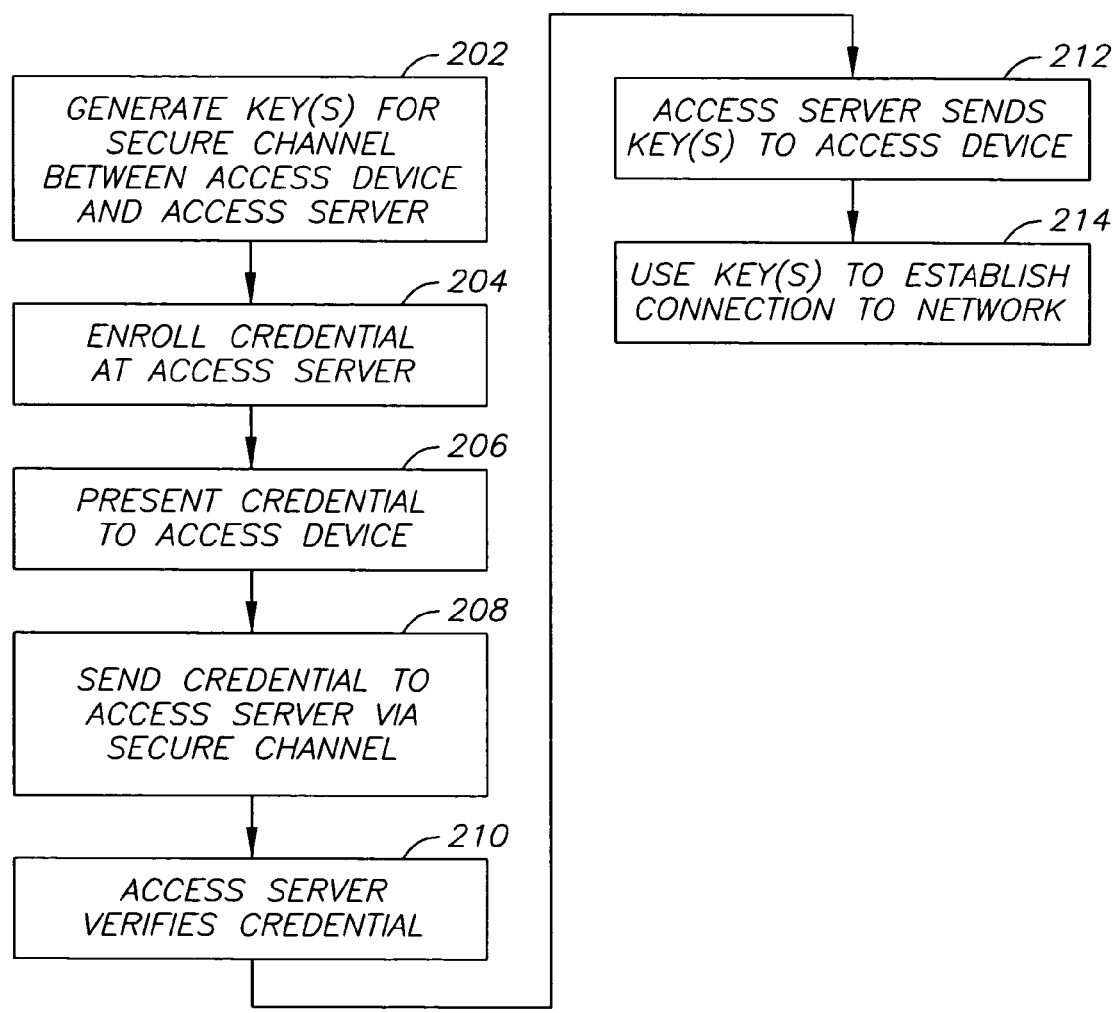
FIG. 2 is a flow chart of one embodiment of user authentication operations that may be performed in accordance with the invention.

Selected operations of the system 100 will be explained in more detail in conjunction with the flowchart of FIG. 2. As represented by block 202, one or more keys may be generated to enable the access device to securely communicate with the access server. In some embodiments, this is accomplished through the use of asymmetric keys.

For example, a unique asymmetric identity key 114 may be provided for each access device. The private key portion of this asymmetric key may be stored within a security boundary (represented by dashed line 112) in the access device. For example, a cryptographic processor 128 may generate the key within this security boundary and the private portion of the key may never be allowed to appear outside of the security boundary 112 in the clear (i.e., unencrypted). Additional details of a security boundary are provided below.

The public portion of the key may then be published with a digital certificate. For example, the manufacturer of the access device may publish the public key and the certificate on a publicly accessible server. The certificate serves to verify that the public key is authentic, that the private key has not been disclosed outside the security boundary and that the access device that holds the private key provides a mechanism to securely receive, use and maintain keys. Thus, the certificate serves to strongly verify the authenticity of any information provided by an access device that has the corresponding private key.

In some embodiments, the access device and the access server may use the asymmetric key to negotiate one or more other keys that may be used for cryptographic processing. For example, these other keys may be used to encrypt, decrypt, sign, etc., information send between these components. In this way, a secure channel (represented by dashed lines 116) may be established between the access device and the access server. That is, each component will have one or more keys that enable it to decrypt encrypted information that it received from the other component. In this way, sensitive information (e.g., keys) may be securely sent over a link 118 that may not otherwise be secure.

Referring now to block 204, to enable the access server to recognize the credentials assigned to a given user, the credentials are enrolled (e.g., entered into) the access server. This may be accomplished, for example, using a credential enrollment mechanism 120. In some embodiments the credential enrollment mechanism may comprise a keyboard and monitor console for the server. In some embodiments the credential enrollment mechanism 120 may be inside a security boundary associated with and enforced by the key manager 110. For example, the credential enrollment mechanism 120 may comprise a keyboard that is physically attached to the key manager, an RFID reader, a biometric sensor, etc. Additional details of these types of components are discussed below.

The credential enrollment mechanism 120 provides the credential information to the key manager 110 which may then generate one or more keys associated with that credential. These keys may comprise, for example, SSL or IPsec keys/security associations that may enable the user to log onto a security network. The key manager may then maintain a database that associates each authorized user's credential (e.g., credential A) with key(s) and certificate(s) (e.g., key A) that may be generated for that user.

The credentials and the associated key(s) may be stored in a secure data memory 122. In some embodiments the data memory 122 may be protected within a physical security boundary of the key manager 110. For example, the database 122 may be located within a secure enclosure and/or within the same integrated circuit as the key manager. In some embodiments the data memory 122 may be located external to the key manager. In this case, however, the key manager may encrypt the keys before they are stored in the data memory.

Referring to block 206, when a user wishes to access a service via the access device 102, the user presents his or her credentials 108 to the access device. In some embodiments the credentials 108 may be provided to the access device via, for example, a keyboard and display provided by the access device.

In some embodiments credentials may be provided to the access device via a direct path into the security boundary of the access device. For example, in the access device 104 credentials 132 may be directly entered (as represented by dashed line 134) into a device located within a security boundary 136. This may be accomplished, for example, using a keyboard that is physically attached to a component within the security boundary, an RFID reader, a biometric sensor, etc. Additional details of these types of components are discussed below.

Referring to block 208, the access device 102 sends the credentials 108 to the access server 106 via the secure channel 116 discussed above. For example, a cryptographic processor 128 may use a key obtained from the negotiation with the access server 106 discussed above to encrypt the credentials. Typically, the cryptographic processor(s) 128 sign the credentials using such a key or the private key 114.

At block 210, cryptographic processor(s) 124 in the access server 106 process the encrypted/signed credentials. Through this cryptographic process, the access server obtains strong authentication that the credentials are from a user that is using a specific access device 102. Moreover, assurances may be made via the certificate that an input device (e.g., keyboard, sensor, RFID components, etc.) through which a user inputs credentials is bound to that access device.

The access server 106 then checks the credential database to verify that the credentials are associated with an authorized user. For example, the access server may determine whether the credential matches a credential (e.g., credential A) stored in the data memory 122.

If so, the access server 106 generates or retrieves the key (e.g., key A) that corresponds to that credential. The access server then sends the key to the access device 102 (block 212). Typically, the cryptographic processor 124 will encrypt the key to protect it during transmission. Here, the cryptographic processor may use a negotiated key or the public key associated with the private key 114 to encrypt key A.

Once the access device 102 receives encrypted key A, the cryptographic processor 128 decrypts the key and stores decrypted key A 140 within the security boundary 112. Here, the cryptographic processor 128 may use a negotiated key or the private key 114 to decrypt key A. The access device 102 may then use key A 140 to, for example, establish a connection with a network (block 214).

If desired, the user may then use another access device (e.g., access device 104) to access the network. Again, the user presents his or her credentials (e.g., the same credentials referred to above) to access device 104. Cryptographic processor(s) 142 may then encrypt/sign the credentials and send them to the access server via a secure channel 146 over a link 148 that may not otherwise be secure. Again, an asymmetric identity key 144 may be used to establish the secure channel 146, form the basis of a digital certificate, sign credentials, etc. The access server 106 then verifies the credentials. Here, since the access server has received the same credentials it may assume that the same user has authenticated to the access device 104. Accordingly, the access server sends the same key (e.g., key A) to the access device 104 via the secure channel 146, thereby binding these access devices together. The cryptographic processor 142 decrypts encrypted key A and stores decrypted key A 150 within the security boundary. Access device 104 may then use key A to connect to a network or access another service.

In addition, more than one set of credentials may be presented to a given access device to access a network. For example, multiple users that are assigned different credentials may share an access device. In addition, the same user may have different credentials that provide access to different services such as personal services or employer provided services. Accordingly, another set of credentials may be stored in the access server database and associated with a unique key (e.g., key B). When these other credentials are presented to the access device 104, the key B will be provided to the access device 104 using the secure techniques discussed above. Accordingly, access device may use the key B 150 to establish a separate, cryptographically secure connection to a network.

Figure 3:
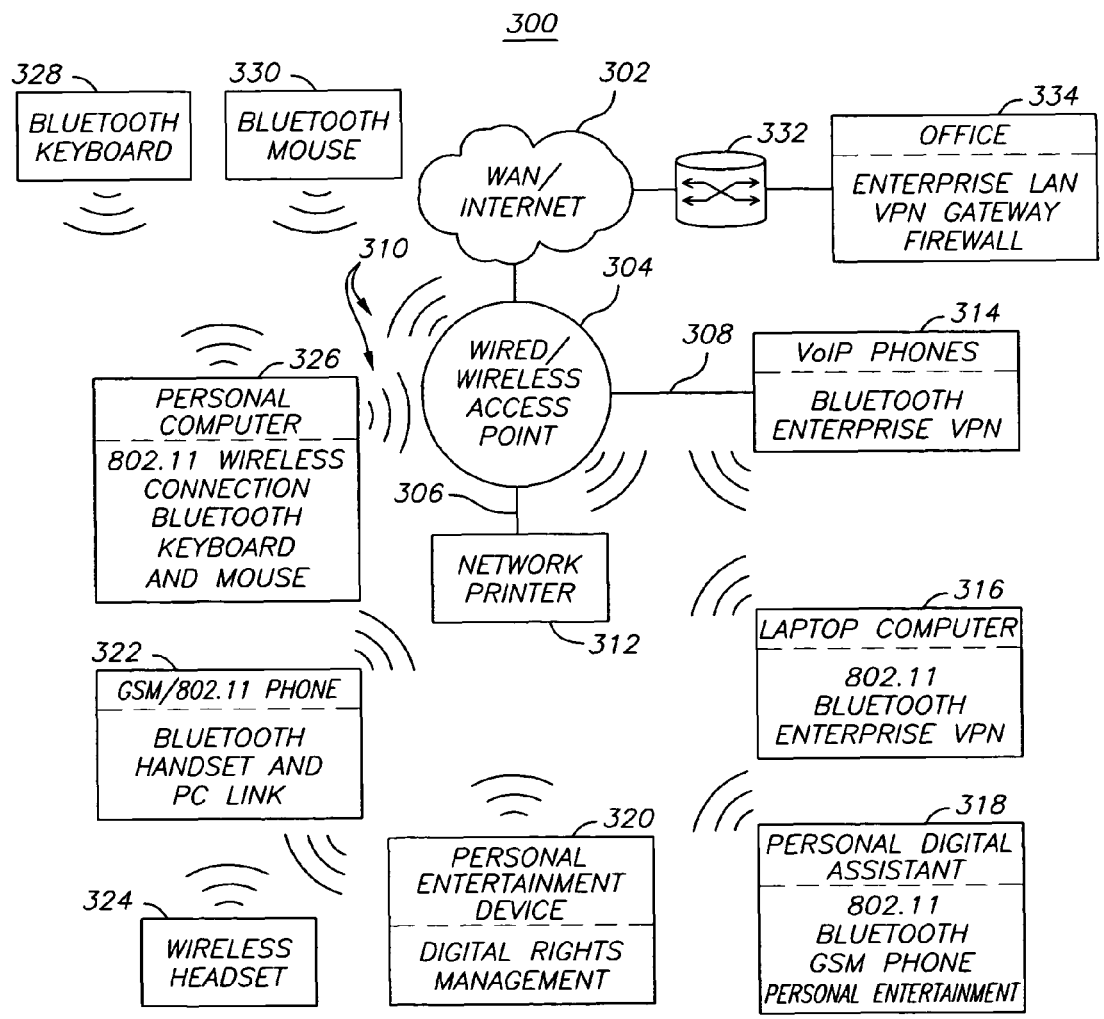
FIG. 3 is a simplified block diagram of one embodiment of a user authentication system constructed in accordance with the invention.

These aspects of the invention will be described in more detail in conjunction with FIGS. 3 and 4. FIG. 3 is a simplified diagram of one embodiment of a network system that may support a variety of communication and data processing devices.

In FIG. 3 access devices connect to a wide area network ("WAN") 302 such as the Internet via an access point (e.g., a router) 304. Here, the access point may serve as the access server discussed herein. Alternatively, the access point 304 may connect to an access server (not shown) such that the credentials and keys pass through the access point as they are sent between the access server and the access devices. In either case, credentials for any users that are authorized to access the system may be enrolled with the access server.

The access point 304 may provide connectivity for wired or wireless devices. For example, a network printer 312 may be connected to the access point by a wired connection as represented by line 306. A voice-over-Internet-Protocol ("VoIP") phone 314 also may connect to the access point via a wired connection as represented by line 308.

Other devices may connect to the access point via radio frequency ("RF") signals as represented, for example, by the curved lines 310. Here, the access point 304 may support wireless standards such as Bluetooth, 802.11, GSM, etc.

Examples of access devices include a VoIP phone 314 that supports the Bluetooth protocol; a laptop computer 316 that supports 802.11 and/or Bluetooth; a personal digital assistant ("PDA") 318 that supports 802.11 and/or Bluetooth and may include a cellular telephone that supports, for example GSM; a personal entertainment device 320; a phone 322 that supports GSM and/or 802.11 and that communicates with peripherals such as a wireless headset 324 via Bluetooth; and a personal computer 326 that supports an 802.11 wireless connection and that communicates with wireless peripherals such as a Bluetooth-enabled keyboard 328 and mouse 330.

As discussed herein, each of the devices 312-330 may include a security module (not shown) that enables the device to securely and efficiently receive any keys necessary to connect to the data network 302 and/or to other devices. In the latter case, for example, keys may be securely distributed between devices to enable a peripheral (e.g., keyboard 328) to securely communicate with a base device (e.g., computer 326). Accordingly, users may connect any of these devices to the network or other devices by simply providing their credentials to the device(s). In the case of the peripherals (e.g., keyboard 328), the credentials may first be passed through the base device (e.g., computer 326), then routed to the access server 304.

Additional details of the authentication components and processes that may be incorporated into these devices are described herein. For example, several embodiments for providing credentials to an access device or an access server are discussed below in conjunction with FIGS. 5-8. In addition, several embodiments of security modules are discussed below in conjunction with FIGS. 9-12.

Figure 4:
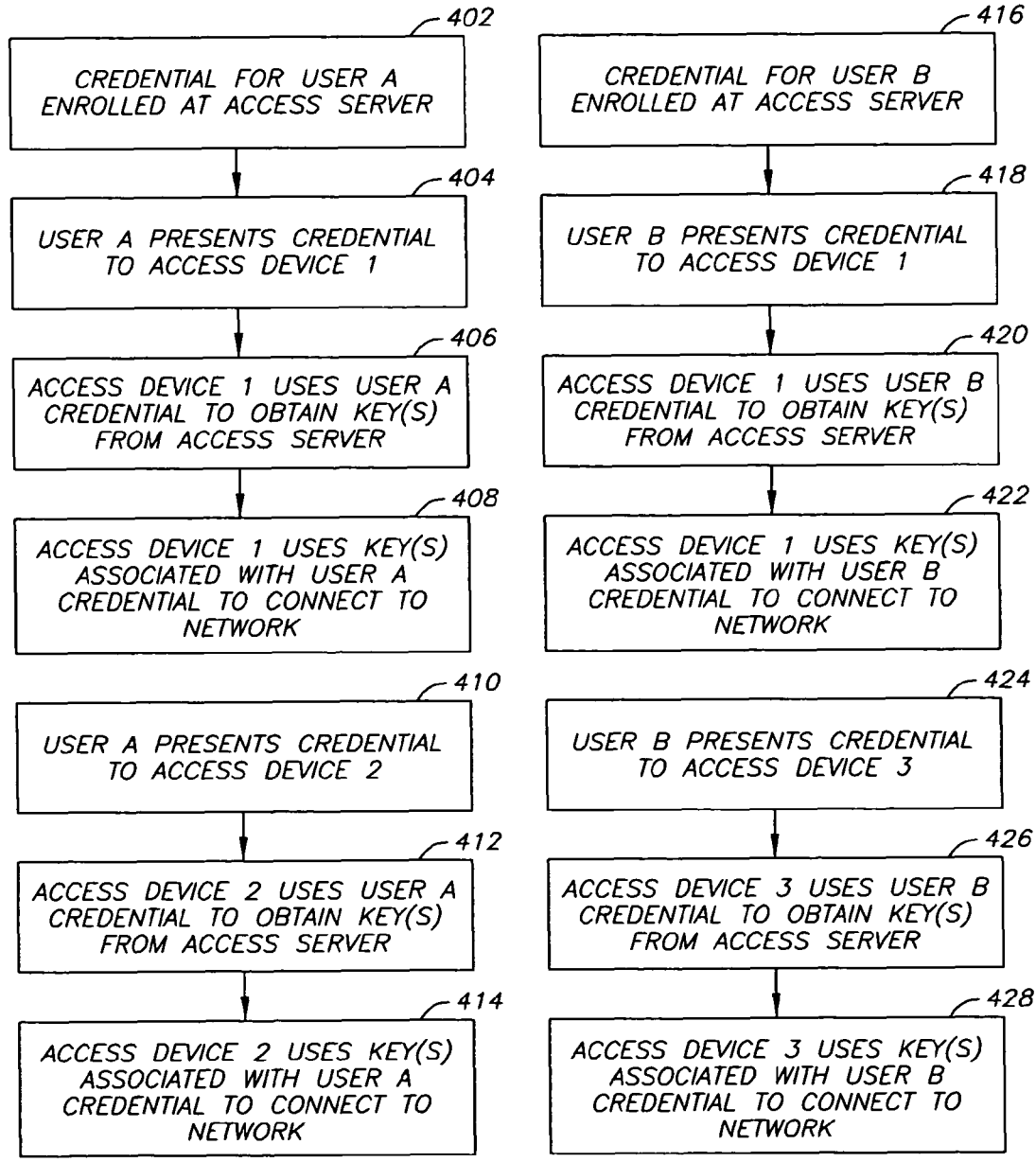
FIG. 4 is a flow chart of one embodiment of user authentication operations that may be performed in accordance with the invention.

Referring to FIG. 4, a simplified flowchart is illustrated relating to operations that may be performed in a network system (e.g., as shown in FIG. 3). For example, such a system may include multiple access devices and support multiple users and multiple levels of credentials. In general, these operations may be performed as discussed herein, for example, in conjunction with FIGS. 1 and 2. For convenience, not all of the operations involved in the process are illustrated in FIG. 4 or discussed below.

As represented by block 402, a credential for a user (referred to for convenience as "user A") is enrolled with the access server. At block 404, user A presents his or her credential to an access device (referred to for convenience as "access device 1"). The access device 1 sends the credential to the access server and, after the access server verifies that the credential has been enrolled, the access server sends the associated key(s) to the access device 1 (block 406). Access device 1 may then use the key(s) associated with user A to connect to the network (block 408).

Blocks 410-414 illustrate that a network may be automatically built as a user presents his or her credentials to multiple access devices in the system. As represented by block 410, user A may present his or her credential to another access device (referred to for convenience as "access device 2"). The access device 2 sends the credential to the access server and, after the access server verifies that the credential has been enrolled, the access server sends the associated key(s) to the access device 2 (block 412). Access device 2 may then use the key(s) associated with user A to connect to the network (block 414).

Blocks 416-422 illustrate that a given device may be used by several users to access the network. Here, each of the users may be assigned different credentials. As represented by block 416, a credential for another user (referred to for convenience as "user B") may be enrolled with the access server. At block 418, user B also may present his or her credential to the access device 1. The access device 1 sends the credential to the access server and, after the access server verifies that the credential has been enrolled, the access server sends the associated key(s) to the access device 1 (block 420). Access device 1 may then use the key(s) associated with user B to establish an entirely separate and cryptographically secure connection with the network (block 422).

In practice, the separate set of credentials identified above as being associated with user B may be a second set of credentials assigned to a given user (e.g., user A). For example, a user may have one set of credentials assigned for one network (e.g., a home network) and another set of credentials assigned for access to another network. Referring to FIG. 3, the devices 314 and 316 may be used to connect to an enterprise LAN at the user's office. In this case, the second set of credentials may be provided to the office network 334 via the WAN 302 and other routing mechanisms 332. Once the appropriate keys are exchanged, an enterprise virtual private network ("VPN") or other form of connection may be established between the access device and the office network 334.

Again, this network may be entirely separate and cryptographically secured from any other network connections for that user or any other user of the system.

Blocks 424-428 illustrate that the network may be continue to be automatically built as other users present his or her credentials to multiple access devices in the system. As represented by block 424, user B may present his or her credential to another access device (referred to for convenience as "access device 3"). The access device 3 sends the credential to the access server and, after the access server verifies that the credential has been enrolled, the access server sends associated key(s) to the access device 3 (block 426). Access device 3 may then use the key(s) associated with user B to connect to the network (block 428).

The system described above may provide several advantages as compared to conventional systems. Traditional networks may only provide device level authentication that is achieved by manually configuring the head end and all devices that may connect to the network. For example, the router may be configured by an administrator physically connected to a LAN port of the router. Here, the administrator may enter in the keys for the router and identify each of the devices that may connect to the router. In addition, the administrator may manually configure each device in the network with the necessary key to enable the device to connect to that specific router.

In contrast, a network constructed using the teachings described herein may be automatically built by binding components (e.g., access devices) together as a user authenticates himself or herself to these components. This is facilitated, for example, by the ability to securely authenticate at the system level. For example, the proximity of the user may be verified as well as the ability of a security module to protect keys (e.g., using appropriate hardware).

A variety of secure techniques may be used to authenticate a user to a device. For example, a credential may be provided via a direct connection into a key management boundary, credentials may be injected into a security boundary of a device via RFID signals or a sensor may be physically located within a security boundary of a device.

Here, the network may be built using digital certificates based on public/private keys pairs. This process may be initiated by using a private key that is protected on each component and may provide a secure environment where the components may dynamically change the keys.

In addition, each user does not need access to the keys that identify that user since the user does not need to pre-configure each device with the appropriate key. Instead the user may only present information such as a credential to obtain access to the network via a given device.

Moreover, a system may be configured to provide multiple networks. Each of these networks may include a given set of components that are defined for different users and/or for different permission levels for a given user. These networks may be secured from one another by using cryptographic techniques to authenticate access to each network and secure the data flowing though each network.

Referring now to FIGS. 5-8, several embodiments of mechanisms for providing credentials to a device will be discussed. In general, the following description describes providing credentials to an access device. However, these mechanisms also may be used to provide credentials to an access server or some other component in the system.

Figure 5:
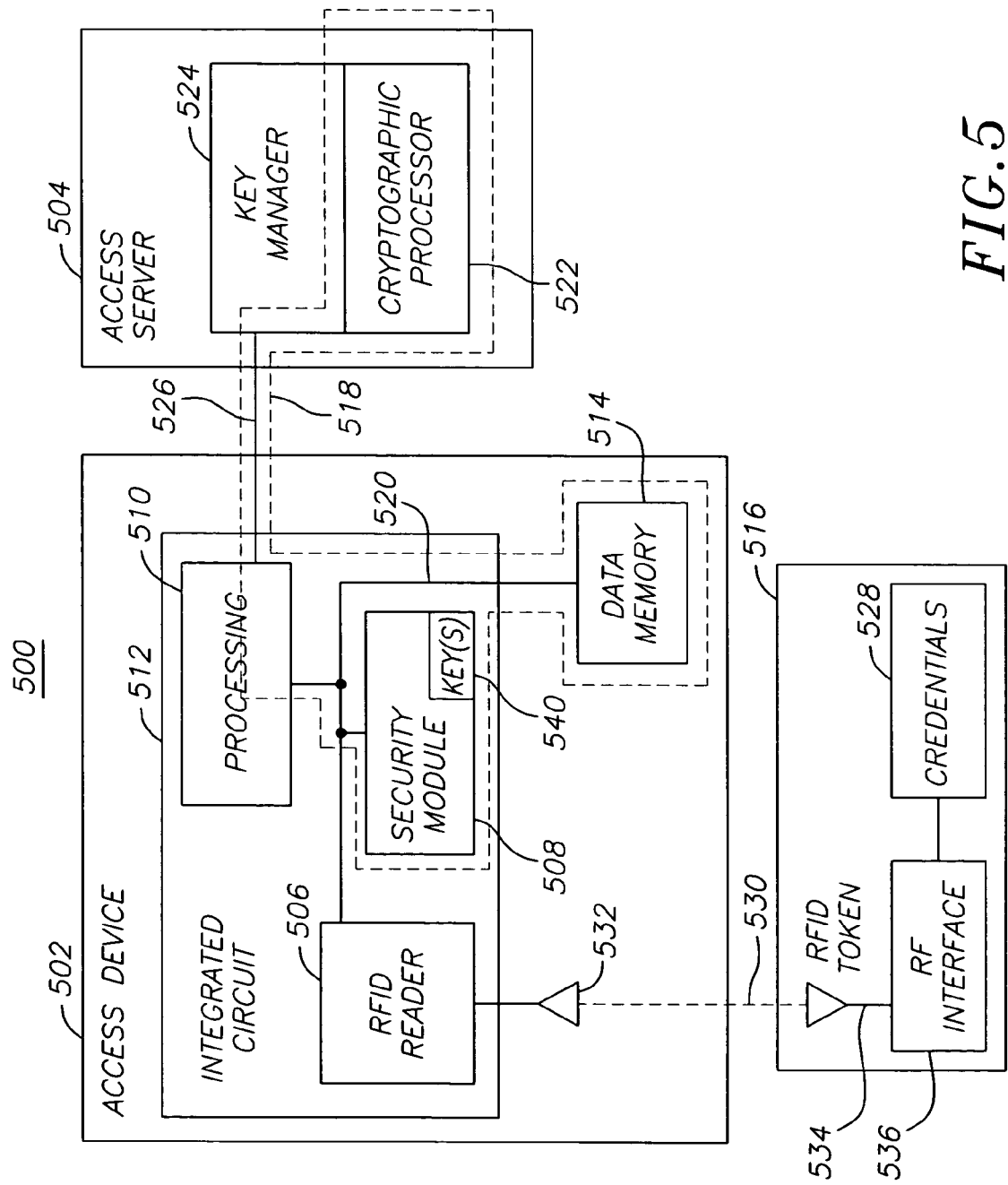
FIG. 5 is a simplified block diagram of one embodiment of a proximity-based authentication system constructed in accordance with the invention.

FIG. 5 illustrates one embodiment of a system 500 where selected services may be provided to a user via a computing device when a wireless token assigned to a user is proximate to the computing device. An access device 502 such as a computer includes components that may be used to determine whether a wireless token (e.g., an RFID token) 516 assigned to a user or users is proximate to the access device 502. For example, a wireless proximity reader (e.g., an RFID reader 506) may be configured to receive signals 530 (e.g., RF signals) from the wireless proximity token 516. The signals 530 may include information that uniquely identifies the wireless proximity token 516. For example, this information may include one or more credentials 528 (e.g., a password) that may be used to access a secured service through an access server 504.

The determination of proximity between the token 516 and the reader 506 may be established using a variety of mechanisms depending on the application. In some embodiments, the token will not generate signals until it is within a given distance of the reader. This may be accomplished, for example, by using a relatively passive token that intercepts signals transmitted by the reader and transmits signals in response to the received signals. Different distances between the token 516 and the reader 506 may be defined as indicative of proximity depending on the requirements of the application and, in some cases, characteristics of the operating environment.

The access device 502 may request access to a service from the access server 504 by sending a request over a communication link 526. Depending upon the particular application, the communication link 526 may comprise, for example, electric wires, optical cables or air. Thus, the access device 502 may support wired or wireless communications with the access server 504.

Typically, access to the service will be initiated by the user's interaction with the access device 502. For example, the user may use a keyboard or pointing device (e.g., a computer mouse) to access the service. In conjunction with this the user may be required to input a password and/or provide a biometric (e.g., a fingerprint) to a biometric sensor to verify the authenticity of the user. In this way, access to a service may be withheld until the user provides adequate credentials including, for example, what the user knows (e.g., a password), what the user possesses (e.g., a token) and who the user is (e.g., a physical or biometric characteristic).

The access device 502 incorporates security mechanisms to ensure that the credentials provided by a user may be secured when the credentials are maintained within the access device are sent to the access server 504. For example, the access device may provide a security boundary within which any information received from the token may be used and maintained in a secure manner. In addition, the access device 502 may include a security module 508 that provides cryptographic processing to encrypt the credentials. In some embodiments information may only pass between the reader 506 and the security module 508 via a connection within a common integrated circuit 512. Thus, the access device may be configured so that the credentials never leave the integrated circuit in the clear.

In addition, the access device 502 may be in secure communication with the access server 504. For example, a cryptographically secured communication channel 518 may be established between the security module 508 and the access server 504. In this case, the security module 508 may process (e.g., encrypt/sign) the credentials before sending them to the access server 504. Accordingly, the security module may provide strong authentication that the credentials are from a specific token 516 that is proximate that particular access device 502.

After the access server 504 has received authenticated credentials from the access device 502, the access server may provide access to the requested service. As used herein the term service may include, for example, access to data and/or a data processing service. Thus, a service may enable an access device to, for example, read or write data in a data memory, access encrypted data, use cryptographic keys, gain access to cryptographic material such as security associations and keys, access a web page, access a data network or access a processing application.

As used herein the term data may include any information that may be accessed by a computing device including, for example, data files, passwords and cryptographic security associations including keys.

As used herein the term access may include, for example, acquiring, using, invoking, etc. Thus, data may be accessed by providing a copy of the data to the access device. Data also may be accessed by enabling the access device to manipulate or use the data. As an example of the latter, once a user has been authorized to access a service a trusted platform module may use keys to perform operations for the user. For a data network, access may include, for example, sending and/or receiving data over the network. For a processing application access may include, for example, invoking, interacting with or using the application or loading the application onto the access device.

An access server may comprise hardware and/or software that facilitate providing a service. For example, an access server may consist of a processing system that processes requests for service, verifies whether the requester is authorized to access the service and provides or facilitates the requested access.

In practice, an access server may be located local or remote with respect to the entity requesting service (e.g., access device 502). For example, a local trusted platform module may control access to passwords in a computing system. In addition, a remote wireless access point may control a computing system's access to a data network connected to the access point.

An access device may comprise hardware and/or software that facilitate access to a service. For example, an access device may comprise a computing system such as, without limitation, a personal computer, a server, a cellular phone, a personal data assistant ("PDA"), etc.

For convenience, FIG. 5 only depicts one token, access device and access server. It should be understood, however, that a system may include any number of these components. For example, a user may use a token to access one or more services via one or more access devices. Thus, an access device may access services from multiple access servers. Also, multiple access devices may access the services provided by a given access server.

Authorization to access a service may depend on the specific token and access device being used. For example, a user may be assigned one token to access certain services through certain access devices. In addition, the user may be assigned another token to access other services through the same or other access devices. Also, multiple sets of information (e.g., credentials) may be included on a single token to enable a user to access different services or to enable multiple users to share a token.

A wireless proximity reader and token may be implemented using one or more of a wide variety of wireless proximity techniques. For example, the proximity reader and the token may support, without limitation, one or more of RFID, ISO 14443 and ISO 15693.

Tokens may be implemented in various physical forms depending upon the needs of the respective applications. For example, a token may be in a form that is easy to carry, similar to a plastic credit card, a "smart card" or a building access card. Also, a token may take the form of a tag or a label that may be attached to another article.

Examples of tokens may include, without limitation, smart cards, credit cards, dongles, badges, biometric devices such as fingerprint readers, mobile devices such as cellular telephones, PDAs, etc. In some embodiments, the token includes circuitry used in a typical smart card. For example, the token may store an encrypted password that may be sent to an authentication system.

Figure 6:
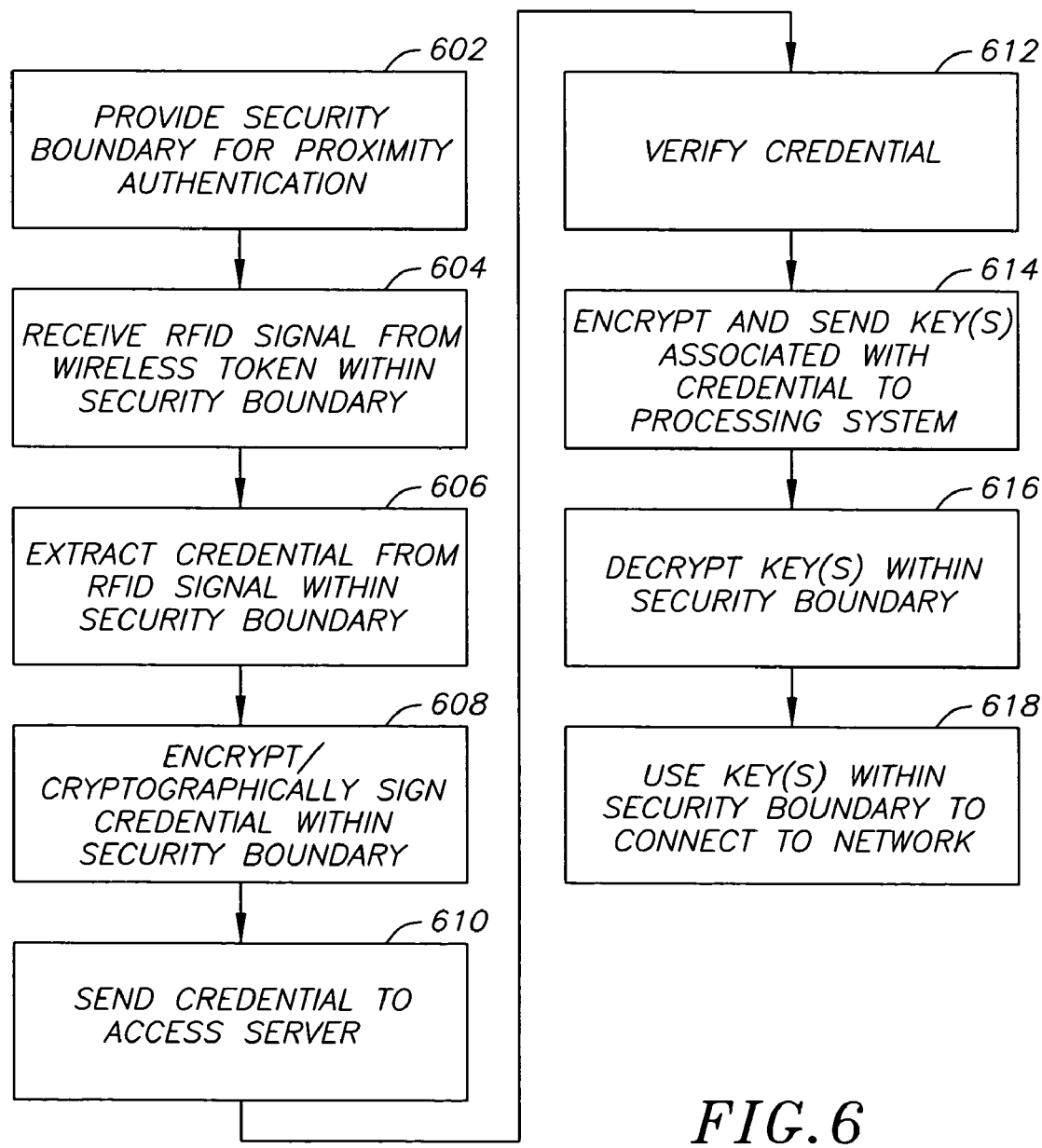
FIG. 6 is a flow chart of one embodiment of proximity-based authentication operations that may be performed in accordance with the invention.

Referring now to FIG. 6 additional details of operations and configurations in a proximity-based authentication system will be described. As represented by block 602, a security boundary is provided within the access device 502 to, for example, secure the process of gaining access to a service, including securing the authentication process and information used during the authentication process. This security boundary may be established, for example, using hardware and/or cryptographic techniques.

Hardware techniques for providing a security boundary may include, for example, placing components within a single integrated circuit. As shown in FIG. 5 an RFID reader 506, a security module 508 and other processing components 510 may be incorporated into a single integrated circuit 512. Thus, any processes performed or information used or stored within the integrated circuit 512 may not be compromised absent physical access to the integrated circuit 512 and the use of an invasive technique for analyzing the internal operations and data of the integrated circuit 512. For many applications, this form of hardware security boundary may provide an acceptably high level of security.

Other means may be used to provide a security boundary. For example, one or more integrated circuits (e.g., integrated circuit 512) may be protected by a physical structure using known techniques (e.g., epoxy encapsulation). Also, the processing system 502 and/or its internal components may be tamper resistant and/or tamper evident.

Cryptographic techniques for providing a security boundary may include encrypting any important information that is sent to or from the integrated circuit via non-secure paths in the system. For example, security associations and keys may only appear in the clear within the integrated circuit 512. In the event keys need to be sent out of the integrated circuit 512 (e.g., to be stored in a data memory 514), the keys may first be encrypted.

Similarly, any important information that is sent between the integrated circuit 512 and the access server 504 may be encrypted. For example, information (e.g., credentials 528) received from the RFID token 516 may be encrypted before being sent over the link 526.

In FIG. 5 a cryptographic security boundary is represented by the dashed line 518. The line 518 represents, in part, that encrypted information may be sent between the security module 508, the processing component 510 and the data memory 514. Thus, the information may be sent securely even though the mechanism through which this information is sent (e.g., a data bus 520) may not be secure.

Encrypted information also may be sent between the integrated circuit 512 and a cryptographic processor 522 in a key manager 524 in the access server 504 via the communication link 526. In this case, the cryptographic processors may perform key exchange and encryption, decryption and/or authentication operations as necessary to send and receive the encrypted information and provide the information in the clear for internal processing.

In general, the form of protection provided within the system may depend on the requirements of a given application.

For example, specifications such as FIPS-140-2 define various levels of security that may be implemented within a system The security boundary provided by the integrated circuit 512 and the cryptographic boundary 518 may be used to provide a secure mechanism for authenticating a user to access a service. For example, credentials 528 received from the RFID token 516 may be provided directly into the integrated circuit 512 via RF signals 530. Thus, the credentials 528 need not be entered into the processing system 502 via a software mechanism or hardware that is accessible by software. Consequently, such information may not be compromised by hacking or a software virus at this stage of the process.

Once the information is in the integrated circuit 512 it may be protected by the physical boundary of the integrated circuit 512 and by the cryptographic boundary 518. For example, provisions may be made to ensure that the information does not appear in the clear outside of the integrated circuit 512. Thus even if rogue software in the processing system 502 were to gain access to the information outside of the chip 512, the software would not be able to decrypt it without appropriate key information. However, the key information also may be protected within the integrated circuit 512 and the cryptographic boundary 518. That is, the key information may not appear in the clear outside of the security boundary. As a result, the credentials may be securely routed to the access server 504.

Moreover, via this secured mechanism, the access device 502 may reliably authenticate to the access server 504 that a specific RFID token 516 is proximate the access device 502. First, as discussed above, the credentials may be received in a secure manner. Second, the effective "decision" as to whether the token 516 is adjacent may be made within the security boundary. The security module 508 may then cryptographically sign this information using a secure protocol set up between it and the cryptographic processors 522 of the key manager 524. Via this signature the access server 504 may be assured that a given message came from a specific processing system (e.g., access device 502) and that the message has not been compromised. Accordingly, proximity of the token 516 to the processing system 502 may be used as a reliable method of authorizing access to a secured service provided by the service provider.

Referring again to FIG. 6, an example of operations that may be used to access a service will be described. As represented by block 604, when the RFID token 516 is within an appropriate range of the access device 502, the RFID reader 506 will receive an RFID signal 530 from the RFID token 516. As discussed above, the RFID signal 530 may be received by the access device 502 within a security boundary.

As represented by block 606, the system 500 may be configured so that any information contained within the broadcast RFID signal may be extracted only within a security boundary. For example, as shown in FIG. 5, the RFID reader 506 that extracts the credentials from the RFID signal 530 may be located within an integrated circuit 512 that includes other functionality to protect the credentials. For example, the integrated circuit 512 may include a security module 508 that encrypts/signs the credential (block 608) to prevent the information from being sent out of the integrated circuit 512 in the clear. Here, the cryptographic processor in the security module 508 may use a private key 540 to encrypt the information. A public key associated with this private key may be published with a certificate from a trusted entity. This certificate serves to verify that the public key is authentic. The cryptographic processor 522 may then use the public key to verify the signature of information received from the security module 508. A complementary process may be used to securely send information in the other direction across the link 526.

Accordingly, after the credential is signed by the cryptographic processor in the security module 508, the signed credential is sent to the key manager 524 via the link 526 (block 610). In this way, the information is, in effect, sent over a secured channel (as represented by the corresponding portion of the line 518) even though the actual data path may not be secure.

The key manager 524 sends the received information to the cryptographic processor 522 for decryption and/or authentication processing as necessary. The key manager 524 then verifies that the received information indicates that the user is authorized to access the network (block 612). In some embodiments the access server 504 may include a wireless proximity device (e.g., an RFID reader) and associated processing to enable the credentials to be easily and directly loaded into the access server when a user presents his or her token to the access server. In other embodiments the information may be acquired using a non-dedicated RFID reader. The acquired information may then be loaded into the access server by other means (e.g., downloaded via a communication medium).

Since the key manager 524 has received an indication via the cryptographic signature associated with the credential that the token 516 is proximate the access device 502, once the credentials are verified the key manager 524 may be assured that is safe to provide access to the requested service. As discussed above, providing access to a network may involve sending security associations or keys to the access device 502. These keys may be sent to the access device 502 via the secured channel (cryptographic boundary 518). Accordingly, the cryptographic processor 522 may encrypt the keys before sending them over the link 526 (block 614).

The access device 502 may be configured so that these keys, etc., are decrypted and maintained within the security boundary of the access device 502 (block 616). For example, the keys may be stored within the integrated circuit 512 (e.g., keys 540). Alternatively, a cryptographic processor in the security module may use a key (e.g., keys 540) to encrypt the received keys before storing them in the data memory 514.

As represented by block 618, the access device may then use the received keys to gain access to the network as discussed herein. Again, in some embodiments these keys may only be used in the clear within the security boundary of the access device 502.

Additional details of a proximity authentication device are disclosed, for example in commonly-owned U.S. patent application Ser. No. 10/955,806, filed Sep. 30, 2004, the disclosure of which is hereby incorporated by reference herein.

Figure 7:
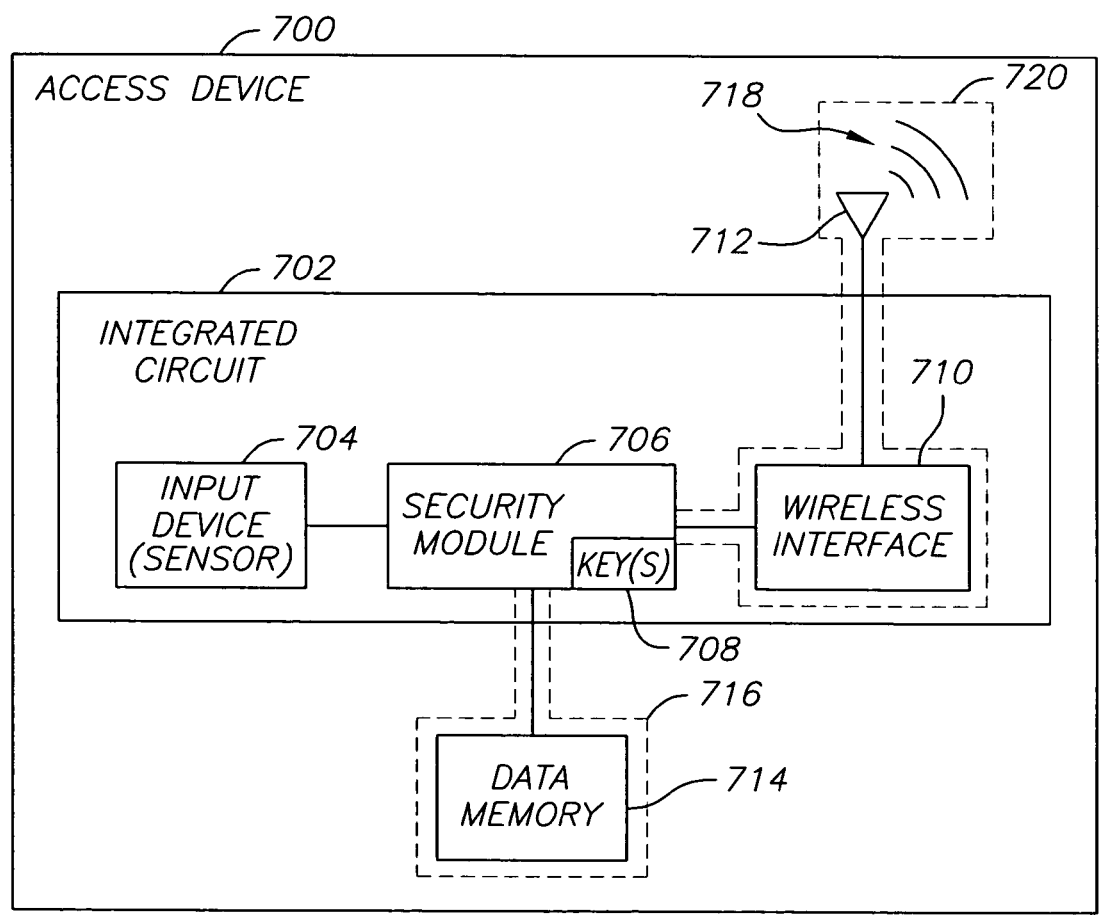
FIG. 7 is a simplified block diagram of one embodiment of an access device constructed in accordance with the invention.

FIG. 7 illustrates another embodiment of an access device that provides a secure mechanism for entering credentials. An access device 700 includes an input device 704 that is located within a security boundary of the access device 700. For example, the input device 704 may be located on the same integrated circuit 702 as a security module 706. As a result, a user may enter his or her credentials directly into the security boundary.

In addition, the security module 706 may use one or more keys (e.g., keys 708) to encrypt credentials within the security boundary so that the credentials are not provided in the clear outside of the security boundary. Thus, the security module effectively extends the security boundary using cryptographic techniques. For example, the security boundary may be effectively extend (as represented by dashed lines 716) to an external data memory 714 by encrypting data before it is stored. In addition, the security boundary may effectively extend (as represented by dashed lines 720) through a communication medium to another cryptographic processing system (not shown).

In the embodiment of FIG. 7, the access device incorporates a wireless interface 710 and an antenna 712 (or another form of wireless transceiver) to communicate with other wireless devices (e.g., a wireless access point and access server, not shown) via wireless signals 718. In some embodiments the data communication interface 710 for the access device may advantageously be located on the same integrated circuit as, for example, the security module 706. The wireless interface may support, for example, 802.11, Bluetooth and/or other wireless communication standards.

In some embodiments the input device 704 is a sensor such as a biometric sensor. For example, the sensor may comprise a fingerprint reader. Alternatively, the sensor may comprise a retina/iris scanner, an audio input device (e.g., a microphone) for speech recognition, a camera sensor (e.g., a CCD device) for, e.g., facial feature recognition or a DNA typing device. In addition, appropriate processing may be provided on the integrated circuit to facilitate retrieval and analysis of this information.

In some embodiments the access device may forward the input information to, for example, an access server to gain access to a service. The information also may be enrolled with a key manager. Thus, as described above, the key manager may compare information received from an access device with the key manager's database of authorized credentials (e.g., fingerprint data). When a match is received, the key manager may provide the associated key(s) to the requesting access device.

In some embodiments the access server may include an input device and associate processing to enable the information to be easily and directly loaded into the access server. In other embodiments the information may be acquired using a non-dedicated input device (e.g., a sensor). The acquired information may then be loaded into the access server by other means (e.g., downloaded via a communication medium).

Figure 8:
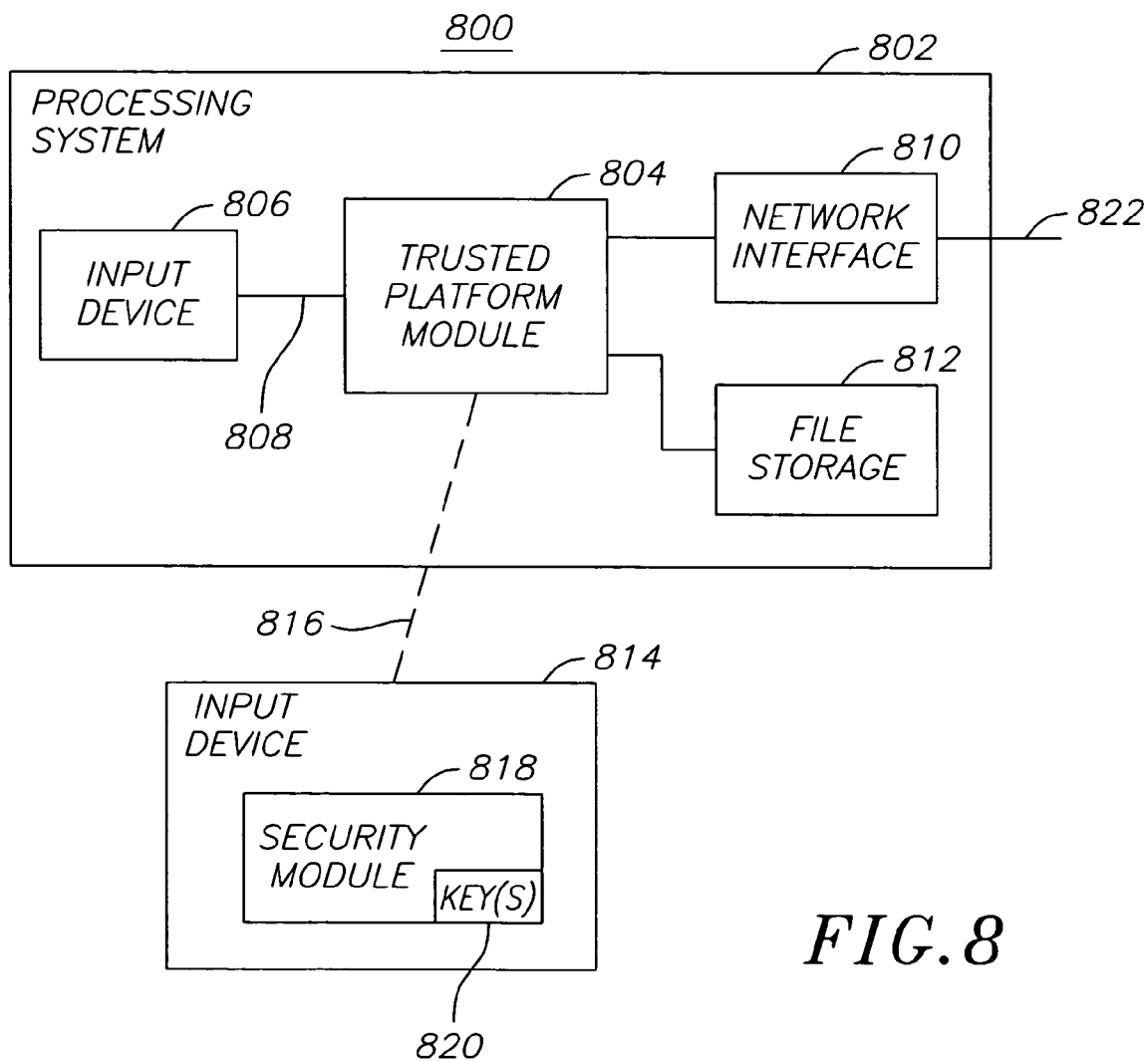
FIG. 8 is a simplified block diagram of one embodiment of a processing system constructed in accordance with the invention.

FIG. 8 illustrates one embodiment of a system 800 that provides a secure mechanism for a user to enter credentials. A processing system 802 includes a secure processing system such as a trusted platform module ("TPM") 804.

Typically, the trusted platform module may generate and maintain keys for the processing system. For example, a TPM may provide a set of cryptographic capabilities that enable certain computer functions to be securely executed within the TPM environment (e.g., hardware). To this end the TPM may include one or more cryptographic processors that perform cryptographic operations including, for example, encryption, decryption, authentication and key management. Specifications for a TPM are defined by the Trusted Computing Group organization.

Typically, to enable access to services managed by the TPM, a user must first enroll his or her credentials with the TPM. This may involve, for example, providing a password to the TPM. To this end, the TPM may include an input device (not shown) that incorporates some of the secure input mechanisms and techniques disclosed in the previous discussions and the discussions that follow (e.g., direct connection, RFID, biometric sensor, keyboard, etc.).

Then, when a user wishes to access the services managed by the TPM, the user must authenticate himself or herself to the TPM. This may involve, for example, providing the original password to the TPM. To this end, the processing system 802 may include an input device 806 that is connected to the TPM via a link 808.

In some embodiments, the link may be routed directly from the input device to the TPM to ensure that data may be securely sent over the link. For example, data from this link may not routed using software routines such as operating system calls. In addition, data from the link may not be stored in data memory that is accessible by other components in the system. For example, the data may not be sent through a software stack and may not be stored in a data memory that is accessed via an internal bus such as a PCI bus. Consequently, input information may be passed to the TPM without being compromised by viruses, hackers, etc., that may have compromised the system. In some embodiments an additional degree of protection may be provided by physically embedding or attaching the input device 806 within/to the processing system.

Through the use of physical and cryptographic techniques the TPM securely uses and maintains sensitive information such as these credentials within its security boundary. After verifying the credentials (e.g., comparing the received credentials with previously enrolled credentials) within the security boundary, the TPM 804 may provide the requested access or may facilitate acquiring access to a service from another processing entity.

In some embodiments a user may authenticate himself or herself to the TMP to use keys stored within the security boundary of the TPM. For example, the system of FIG. 8 may be used to access encrypted data (e.g., an encrypted password) stored in a local data memory (e.g., file storage 812). In this case, the TPM 804 may store cryptographic information (e.g., keys, security associations, etc.) that enables the TPM to decrypt encrypted data. In a typical case, once the user is authenticated, the TPM will use the key within its security boundary, then provide the results to the user. For example, the TPM may return decrypted data (e.g., media content) or signed data to the user. In this way, the keys may be used without exposing the keys in the clear outside the security boundary of the TPM.

In the event there is insufficient storage for the keys in the TPM, the TPM may encrypt the keys and send them to an external data storage component (e.g., file storage 812). Thus, even if the encrypted data files in the file storage 812 may be accessed by other components in the system the security of the encrypted data may be maintained because the keys are encrypted. In other words, sensitive information is only used in the clear within the security boundary of the TPM.

In some embodiments the TPM 804 may control access to one or more data networks 822 that are accessed via a network interface 810. Here, the TPM 802 may provide network authentication credentials (e.g., a certificate) to a service provider (e.g., an access point, not shown) connected to a network to authenticate it to the service provider. These network authentication credentials may be securely stored in a data memory (not shown) in the TPM 804 or stored in encrypted form in the file storage 812.

The network interface 810 may be used to connect to wired and/or wireless network(s). As discussed herein, cryptographic techniques may be used to ensure the security of data transferred between the TPM 804 and other devices connected to the network. Accordingly, a network connection may be used, for example, to communicate with a key manager to obtain key information (e.g., security associations) and authorization for key usage.

Input device 814 depicts another embodiment of an input device that may be used to securely provide information (e.g., credentials) to the processing system. The input device 814 includes a security module 818 and keys 820 implemented within a security boundary to provide cryptographic functionality. For example, the security module may be used to encrypt/sign information (e.g., credentials) entered into the input device. In this way, this information may be securely sent (as represented by dashed line 816) to the TPM 804.

The security module 818 and the trusted platform module 804 may include components and perform operations as discussed herein to provide strong authentication and establish a secure channel. For example, a public key and associated certificate may be published for the security module 818 to enable the TPM to verify the authenticity and the security of the input device using techniques as discussed herein. As a result, a secure channel 816 may be established between these components such that the security boundary of the TPM may, in effect, be extended to include the input device 814 and the secure channel.

Since information sent between the components may be secured in this manner, the input device 814 does not need to be securely connected to the processing system. Thus, the input device 814 may be advantageously used in applications where the input device is remote from the processing system 802 and connected to the processing via, for example, a wired or wireless interface such as a network. In addition, the input device may be advantageously used in applications where the input device may be connected to the TPM via an insecure link (e.g., a USB link in a computer).

In some embodiments, the input mechanism (e.g., a key pad, a sensor, etc.) on the input device 814 may be connected in a secure manner to the security module 818. For example, the input mechanism may be located on the same integrated circuit as the security module. In addition, these components may be implemented within a physically protected enclosure. Accordingly, the security boundary of the input device 814 may include the input mechanism, the security module 818 and external memory (not shown) that the security module uses to store encrypted information. As a result, the input device 814 may provide a highly secure mechanism for a user to provide credentials to the TPM 804

Referring now to FIGS. 9-12 selected components and operations of several embodiments of security modules will be discussed in more detail. In some embodiments a security module may provide key protection and management (e.g., enforcing proper usage of keys) required for multiple levels of key material.

In addition, a security module may provide cryptographic processing such as encryption, decryption, authentication, verification and signing for a device that uses cryptographic services (e.g., an access device) in which the security module is installed. For example, a security module may be implemented in end-user client devices such as cell phones, laptops, etc., that need some form of data security, authentication, etc. In some embodiments the security module may be integrated into previously existing chips (e.g., a main processor) within these devices.

The security module may be configured as part of and to enforce a security boundary. For example, the security module may be configured to never allow clear text keys to exit, for example, the security module or the chip within which the security module is implemented. As a result, the security module may be safely integrated into other devices or systems regardless of whether the system outside of the security boundary is secure.

In this way, the security module may provide highly secure and cost effective remote key management for a client device.

The security module may provide and/or support any required cryptographic processing. A security boundary is established within the device to securely maintain and use keys and key material. Yet the system may be securely managed by a remote key management system (e.g., a hardware security module, a TPM, etc.) via the security module. Accordingly, a high level of security functionality may be provided for the end-user device using a relatively small security module that has minimal impact on the rest of the device.

Figure 9:
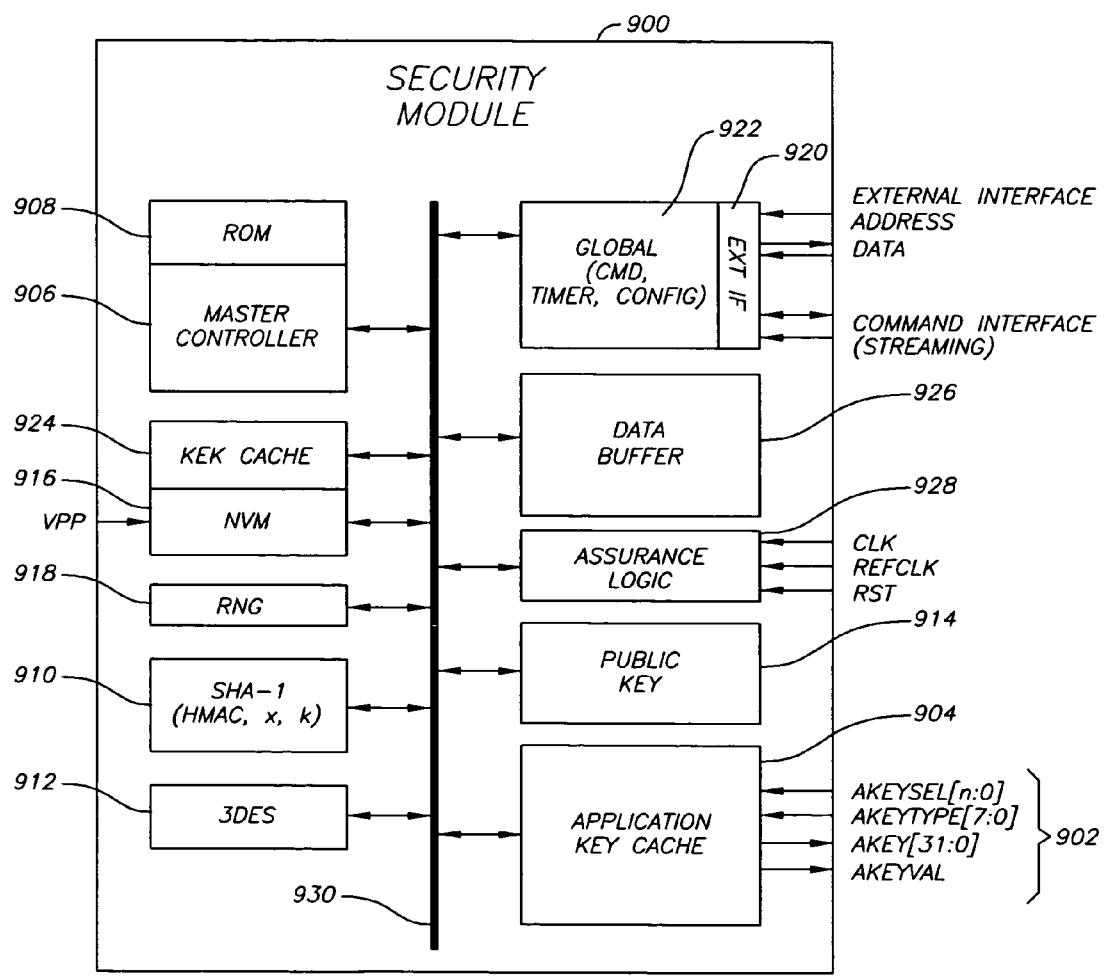
FIG. 9 is a simplified block diagram of one embodiment of a security module constructed in accordance with the invention.

To support this key usage and management scheme, a security module provides mechanisms for securely loading one or more keys into the module, securely storing the keys and securely using the keys. One embodiment of a stateless hardware security module 900 that provides such mechanisms is depicted in FIG. 9.

The stateless module 900 includes a master controller 906 for controlling the overall operation of the module. For example, the controller may control boot operations, key management operations (if applicable) and data and key traffic flow into and out of the module. The controller may comprise, for example, a processor and associated code (e.g., ROM 908) and/or a state machine or other hardware. The controller and/or any other component in the stateless module may communicate with other components in the stateless module via an internal bus 930.

In some embodiments the master controller 906 comprises a RISC processor with ROM code to execute the various commands necessary for the operation of the stateless module. The master controller block also may include the address decoder for each of the slave blocks on the internal bus 930. The RISC engine may use a protected portion of a data buffer 926 for temporary stack and scratch data space.

A bi-directional external interface 920 provides a mechanism to send keys and/or data to or receive keys and/or data from the module. For example, the external interface may include registers that may be written to or read by the controller and external devices (e.g., a host) that are connected to the stateless module. In this case, the controller may be configured so that it never writes certain data (e.g., unencrypted keys) to the registers.

The external data interface 920 may be used by a local host to read global registers, issue commands and place data into the data buffer 926 for processing by the stateless module. The external interface may be controlled through a global register block 922 by the master controller. These global registers may include, for example, command ("CMD"), timer and configuration ("CONFIG.") resisters. The master controller transfers the data between the global registers block and a data buffer memory 926.

The command interface provides a streaming data interface directly into the data input and data output registers. It allows an external FIFO to be used for data input and data output (separate FIFOs). This interface allows the stateless module to be easily embedded into a packet based system.

In some embodiments, data (e.g., data to be processed or key material) to be encrypted or decrypted may be sent to or sent from the stateless module 900 via one or more data interfaces. For example a data interface 902 may be used to send encrypted data or keys (e.g., that were decrypted by the module) to a cryptographic accelerator and vice versa. In addition, a data interface may be connected to an input device (e.g., a sensor) that generates data that needs to be encrypted by the stateless module. This encrypted data may then be sent to an external processing component via the external interface 920.

One or more cryptographic processing blocks perform any cryptographic processing that needs to be done to acquire or use keys or to cryptographically process data flowing though the module. For example, separate processing blocks may be used to perform asymmetric key algorithms such as DSA, RSA Diffie-Hellman (block 914), key exchange protocols or symmetric key algorithms such as 3DES, AES (block 912) or authentication algorithms such as HMAC-SHA1 (block 910). The cryptographic processing block may be implemented, for example, in hardware and/or using a processor that executes code stored in a data memory (e.g., ROM).

Typically this embodiment includes processing to generate asymmetric keys that are used to establish a secure channel with a remote device and to authenticate information sent from the module to the remote device and vice versa. Here, the private portion of the asymmetric key may be maintained within the security boundary of the chip. In addition, the stateless module also will include a mechanism for exporting the public version of the asymmetric key. For example, the public value may be loaded into the external interface register discussed above so that it may then be read by an external device. The public key value may be read from the stateless module by issuing a public key read command to the stateless module. In response to this command the module returns the public key value and any non-secure configuration information for the device (authorization data, product configuration data, etc.).

In some embodiments a root, identity key serves as the basis for the asymmetric key. For example, the root key for the module may comprise an asymmetric key pair (secret or private, public) that is used to uniquely identify the stateless module. In some embodiments this key is only used for digital signatures to securely identify the stateless module.

In some embodiments, one or more keys (e.g., the root, identity key for the module) may be injected into the stateless module. This may be performed, for example, when the chip is manufactured, when the chip is tested, during manufacture at an OEM (e.g., circuit board manufacturer), during OEM testing or during installation for the end user. This technique may be used to inject symmetric and/or asymmetric keys.

In some embodiments, the stateless module may generate one or more keys (e.g., the root, identity key) internally. For example, the stateless module may include a random number generator ("RNG") 918 and other circuitry necessary to generate a key. This embodiment may provide added security in that the generated key may never leave the security boundary of the chip.

In some embodiments the device identity key comprises a collection of random bits that are used to generate the key material for the long term fixed keys in the stateless module. For example, the RNG 918 may generate a random number using the internal random number value as a secret initialization seed. The number of bits in the initialization seed may be determined by the amount of key entropy required for the system.

In some embodiments the value from the random number generator 918 may not be used directly. For example, it may be post processed using the SHA-1 block 910 by the master controller before internal usage and before exposing the number external to the stateless module as a random value. The master controller may maintain a cache of post processed random bits (for key generation and for signing) in the data buffer 926.

The random number generator 918 may be a "true" random source. For example, it may utilize free running oscillators to capture thermal noise as the source of randomness.

The stateless module also may include a privacy (or confidentiality) asymmetric key pair that may be used for transferring secure content to the stateless module device via an intermediate insecure third party such that the third party does not have access to the key material. In some embodiments the confidentiality key is only used to decrypt key material within the stateless module.

The above keys (e.g., the root, identity key, etc.) may be stored in a nonvolatile data memory ("NVM") 916. The NVM may comprise, for example, a one-time programmable ("OTP") memory or battery backed memory (BBMEM) that is located on-chip or off-chip.

In some embodiments an on-chip OTP memory (as shown in FIG. 9) may provide certain advantages. For example, in this case the keys may be physically protected within the device so that they cannot be easily altered or observed. In addition, since the use of the keys may be confined within the chip, the keys may not appear in the clear outside of the chip. Moreover, this OTP and stateless module combination may then be implemented using a standard CMOS process. As a result, the stateless module may be readily integrated into a variety of conventional chips that are used in end-user and other devices. Such a combination may provide a very cost effective security solution.

Examples of architectures and implementations of OTP memory that may be advantageously implemented in CMOS are described in, for example, U.S. Pat. Nos. 6,525,955, 6,693,819, 6,700,176 and 6,704,236 and U.S. patent application Ser. No. 09/739,952, filed Dec. 20, 2000, the disclosure of each of which is hereby incorporated by reference herein.

The OTP may be programmed by the master controller 906 via a programming interface in conjunction with an external programming signal VPP. The master controller may ensure (via local hardware enforcement) that the device keys, authorization and configuration data can be programmed once and only once.

The key-encryption-key ("KEK") cache 924 is a separate memory block sized based on the required number of KEKs in the system. Typically, it is large enough to hold the session private key and a single asymmetric group key.

The KEK Cache 924 may be protected in hardware during the execution of any command that does not require a KEK key. For example, a signal from the global registers may be provided to the KEK cache to indicate that the command register is locked, active and contains a command that requires a KEK. Some KEK cache locations are contained in the NVM block that is used to implement the long term keys for the stateless module.

The application key cache 904 may be used by the master controller to provide encryption and decryption storage for the internal acceleration cores (such as the public key core 914 or the 3DES core 912). The application key cache may enforce key lifetime expiration when the keys are used by either the stateless module commands or the application key cache interface.

In general, the performance, size and function of the blocks discussed above may be scaled to meet the demands of the system. For example, the basic cryptographic functions that implement the secure channel back to the key manager to transfer and process key material (and/or policy) may be provided at minimal processing performance levels.

The cryptographic accelerators contained within the stateless module can be used for application data processing when they are not being used for key management functions. For example, a stateless module for an e-commerce application may be used to protect RSA private keys. Here, the public key acceleration required for the secure channel is typically minimal (less than 10 operations/sec). Consequently, any spare processing capacity (e.g., idle cycles of a processor) may be used for other operations.

In contrast, public key acceleration required for a typical e-commerce accelerator is relatively high (greater than 500 operations/sec). Applications such as this may require the use of cryptographic accelerators that are specially designed to perform cryptographic operations at a high rate of speed.

One or more cryptographic accelerators may be attached directly to the stateless module via the application key cache interface 902. Typically, the application key cache interface for the add-on cryptographic acceleration processing is maintained within the security boundary. For example, the stateless module and the cryptographic accelerators may be implemented on the same chip. In this manner, the cleartext keys are not allowed to leave the security boundary which also includes the public key accelerator. However, the external application may use the public key accelerator as it normally would by simply referencing the appropriate RSA private key stored in the stateless module.

The application key cache 904 also may store key material that may be used by external cryptographic acceleration processors. For example, the cache 904 may store decrypted application keys (e.g., the RSA private key for an application executing on the device that contains the stateless module).

The stateless module enforces key policy for keys used within the remote client. The key policy may be set by the key manager for all keys that are delivered to the stateless module. The key policy indicates how the key can be used by the stateless module. In addition to usage policy, the stateless module can enforce a lifetime for keys. Typically, a key lifetime is a relative time from the time at which the key is loaded into the stateless module. The key manager can use the multiple levels of key hierarchy and the lifetime policy enforcement to ensure that keys are used properly and are revocable at the stateless module.

A security assurance logic block 928 protects the stateless module from system security attacks. To this end, several system monitors may be coupled with the other components in the stateless module and/or the chip (and/or the system) within which the stateless module resides.

In some embodiments, the protection circuits trigger a reset of the stateless module when an attack is detected. This reset may wipe out all transient information in the stateless module. For example, all key cache locations may be cleared. An interrupt may be provided to the local host with information on which protection mechanism triggered the reset.

A low frequency protection circuit ensures that the operating frequency of the stateless module does not fall below given threshold. This ensures that the time tick register value can not be compromised within the limit of a reference frequency. In addition to protecting the time tick value, the low frequency protection circuit makes it more difficult to implement successful dynamic attacks that attempt to read values within the stateless module while it is operating. In this case, the higher the threshold value, the better protection that is provided.

An operating point protection circuit may be provided to ensure that all logic within the stateless module operates as designed for all process, voltage and temperature conditions (or across all operating points). The protection circuit helps ensure that an attacker cannot change the operating point such that a timing path is violated in the stateless module.

A watchdog timer block may be used during processing to ensure that command execution completes within an expected period of time. The timer is set by the master controller whenever a command (or sub-command such as a public key operation) is started. The set time is based on the expected maximum command length. If the watchdog timer reaches zero a reset is issued to the stateless module. The watchdog timer cannot be turned off and must be written periodically by the master controller to avoid clearing the stateless module. The watchdog timer may be frozen when the stateless module is taking command input from the host.

A reset monitor provides protection against multiple reset attacks. The reset monitor uses a timer based on the time tick register increment that requires at least one tick before allowing more than, for example, sixteen resets to occur. If more than sixteen resets occur within the time tick, the stateless module will require at least two time ticks before releasing the sixteenth reset. The reset protection is disabled until the NVM has been properly programmed. For example, it may be disabled during manufacturing tests.

A hardware protection mechanism may be provided for entering and exiting a secure state while the stateless module transitions between enabling/disabling the external interface. The stateless module boots to a secure state with the external interface disabled. That is, the interface is locked out by hardware. Once reset processing and self-tests have completed, the master controller sequences through a series of commands to exit the secure state and enter a USER state. In some embodiments these commands require execution of a predefined set of sequential instructions be written to non-sequential addresses.

The hardware tracks the number of clocks it takes to execute each step of the sequence and ensures that these commands occur in the required order to the required address at exactly the right clock cycle. After the exit logic has completed, the mode is set via hardware to USER mode. In USER mode, the hardware locks out master controller access to all of the internal blocks except the data buffer and the data input/output registers (only blocks that are required to move data into the device).

Once the command has been moved into the data buffer, the master controller sequences a series of commands to return to the secure state. This sequence is again tracked and enforced via the hardware block to enter into secure mode. It also ensures via hardware that the master controller enters the secure mode with the proper entry address.

The master controller ROM 908 may be programmed using an extra bit to indicate which instructions are valid code entry and code exit points. The instruction code entry/exit points are enforced in hardware whenever the master controller takes a non-sequential code fetch. This mechanism helps to ensure that it will be difficult for an attacker to get the master controller to bypass certain portions of code. As a result, it may be virtually impossible to successfully attack the module by causing random jumps in the program execution.

To reduce cost and die space, the stateless module may not handle processing related to communication protocols. Instead, the requirements of communication protocols may be handled by an associated device driver (or integrated processor).

In an alternative embodiment, the stateless module may be assigned long-term keys. In this case, the stateless module may not need to interface with a head-end server (e.g., key manager).

Figure 10:
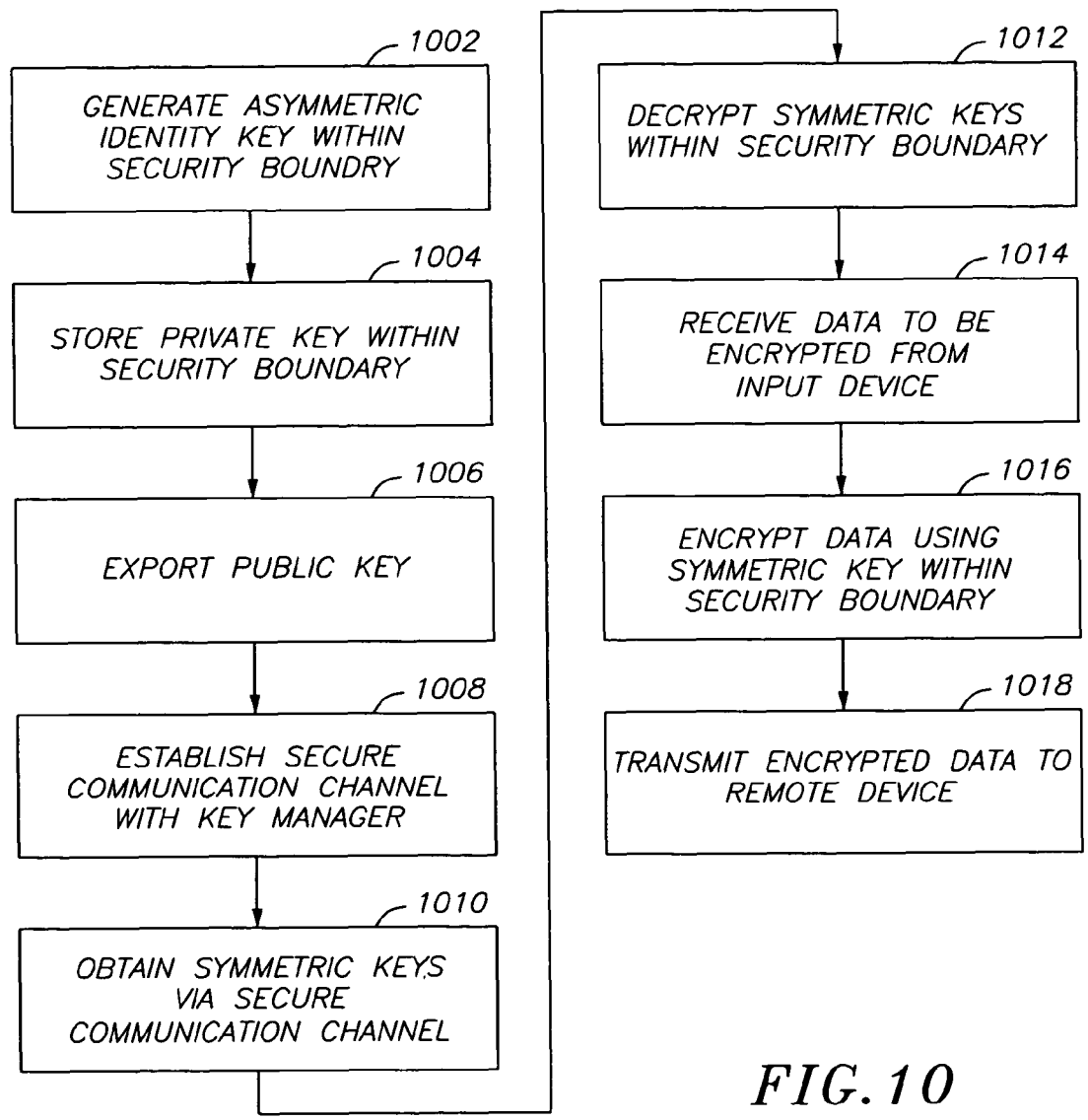
FIG. 10 is a flow chart of one embodiment of operations that may be performed in accordance with the invention.

Referring now to FIG. 10, an example of operations that may be performed by one embodiment of a stateless module will be discussed. As represented by block 1002, when the stateless module is initialized for the first time after manufacture (e.g., during final test of the chip), the master controller may cause the random number generator 918 to generate a random number that is provided as a seed to a cryptographic processor that generates a public-private key pair.

The master controller stores the private (identity) key in the nonvolatile memory 916 and never exports this key outside of the security boundary of the module (block 1004). For example, in some embodiments the key never leaves the chip within which the stateless module resides. In some embodiments this key is encrypted before being stored in off-chip non-volatile memory.

The stateless module also stores the corresponding public key and, upon request, exports the public key (block 1006) so that the device manufacturer (or some other trusted entity) may publish the public key along with a certificate to a public server.

The stateless module may then be deployed in a computing device that can connect to another device (e.g., a key manager) via a network or some other link. As represented by block 1008, the stateless module may use its private key to establish a secure communication channel with, for example, a key manager that has access to the stateless module's public key.

As represented by block 1010 the key manager may send keys to the stateless module via the secure communication channel. For example, the key manager and stateless module may negotiate to obtain additional keys that may be used to provide secure communications between the two components. In addition, the key manager may send keys to a remote client via the stateless module. For example, the key manager may generate a private session key (Ka-priv) for a client that incorporates the stateless module. As discussed above, the key manager may encrypt this key using the stateless module's public key (Kdc-pub) or some negotiated key before sending it to the client.

As represented by block 1012, the keys are decrypted within the security boundary associated with the stateless module. For example, cryptographic processors in the stateless module may decrypt these keys. Alternatively, another cryptographic processor located on the same chip as the stateless module may decrypt the keys.

As represented by block 1014, the stateless module may then use the keys within the security boundary. For example, cryptographic processors in the stateless module may use these keys to decrypt other keys (e.g., session keys). In addition, the stateless module may enforce key policy within the security boundary (block 1016).

In some embodiments, as represented by block 1018, the stateless module may provide keys to one or more cryptographic accelerators within the security boundary. For example, the cryptographic accelerators may be located on the same chip as the stateless module.

Figure 11:
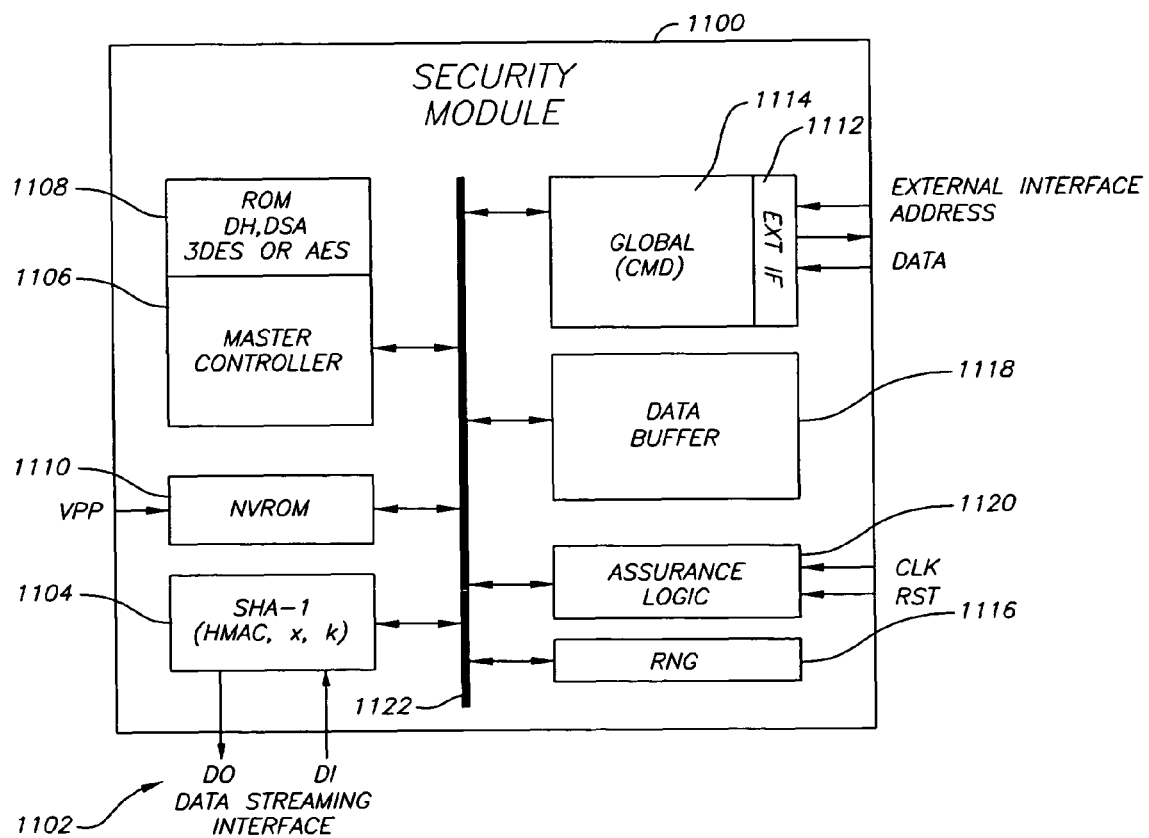
FIG. 11 is a simplified block diagram of one embodiment of a security module constructed in accordance with the invention.

Referring now to FIG. 11, one embodiment of a stateless secure link module 1100 will be discussed in detail. This embodiment includes, in general, a subset of the functionality of the embodiment of FIG. 9. In particular, this embodiment only provides data encryption, decryption, etc. using a symmetric key. One advantage of this configuration is that it may be implemented in other devices with even less impact on the cost and the size of the devices.

In a typical application the embodiment of FIG. 11 is used to take data that originates from an input device and securely provide that data to a recipient device that uses the data. This process may involve encrypting the data so it does not appear in clear text and/or signing the data to certify to the recipient device that the data originated from a specific input device.

For example, the stateless module may be integrated into a chip for a sensor (e.g., a biometric sensor such as a fingerprint reader). Here, the stateless module may be used to sign and/or encrypt the information generated by the sensor. The stateless module may then securely send the information to a recipient device that uses the information. In this case, the recipient device may use a fingerprint comparison as a means to control access to data or a service.

In some embodiments the sensor data is always maintained within a security boundary. First, by incorporating the stateless module into the sensor chip, the information may be encrypted before it leaves the hardware boundary of the chip. Second, the stateless module may establish a secure channel with the recipient device through a symmetric key exchange. In this way, the information may be securely sent to the recipient device. Third, the recipient device may be secured in a conventional manner or using techniques as described herein.

As an example of the latter scenario, the recipient device may include a stateless module as described above in conjunction with FIG. 9. In this case, the recipient device may use other keys to, for example, securely send the information to a remote system. One example of such a remote system is a network access device that enables access to a network based on the user's credentials such as the user's fingerprint.

In other embodiments, it may only be necessary to establish that the data originated from a specific input device. For example, the system may make other provisions to ensure that a copied fingerprint data stream is not being replayed at a later time. In this case, it may be unnecessary to encrypt the information. All that may be needed here is an assurance that the information is being sent by a specific sensor. In this case, adequate security may be provided by simply signing the data.

To provide a solution that is cost effective for a variety of input devices, the stateless module of FIG. 11 has a reduced set of functionality as compared to, for example, the embodiment of FIG. 9. The stateless module includes a master controller 1106 and an external interface 1112 to enable the asymmetric key operations that are performed when the secure link is initially established with, for example, a key manager. Thus, the controller 1106 includes circuitry to generate and verify the validity of its keys. In addition, the module may include assurance logic 1120 similar to that discussed above.

However, because the module only uses a single symmetric key, much of the functionality depicted in FIG. 9 is not provided in the embodiment of FIG. 11. For example, the module does not need to provide management capabilities (e.g., enforcement of key policy) and data storage (e.g., application key cache) for extra keys. Also, the non-volatile ROM ("NVROM") 1110 may be smaller since it may only store, for example, an identity key and a symmetric key.

Moreover, as this module only performs symmetric cryptographic processing on data from a data streaming interface, some or all of the dedicated cryptographic processors shown in FIG. 9 (e.g., the public key processing and 3DES) may not be needed. For example, the module only performs the asymmetric key operations once after it boots up. In addition, the stateless module does not need to verify the authenticity of the recipient of the data. Accordingly, the remaining cryptographic processing operations may be performed by the master controller 1106. In this case, the application code for cryptographic algorithms (e.g., DH, DSA, 3DES, AES) may be stored in a ROM 1108.

The embodiment shown in FIG. 11 may secure an incoming data stream (DI) by signing it using the SHA-1 algorithm. Accordingly, a separate processing block 1104 may be provided for this operation. The signed output of this processing block provides a data stream (DO) that is sent to the recipient device via a data interface 1102. In an embodiment that also encrypts the data stream, a dedicated processing block (not shown) may be provided to implement, for example, a symmetric encryption algorithm.

Figure 12:
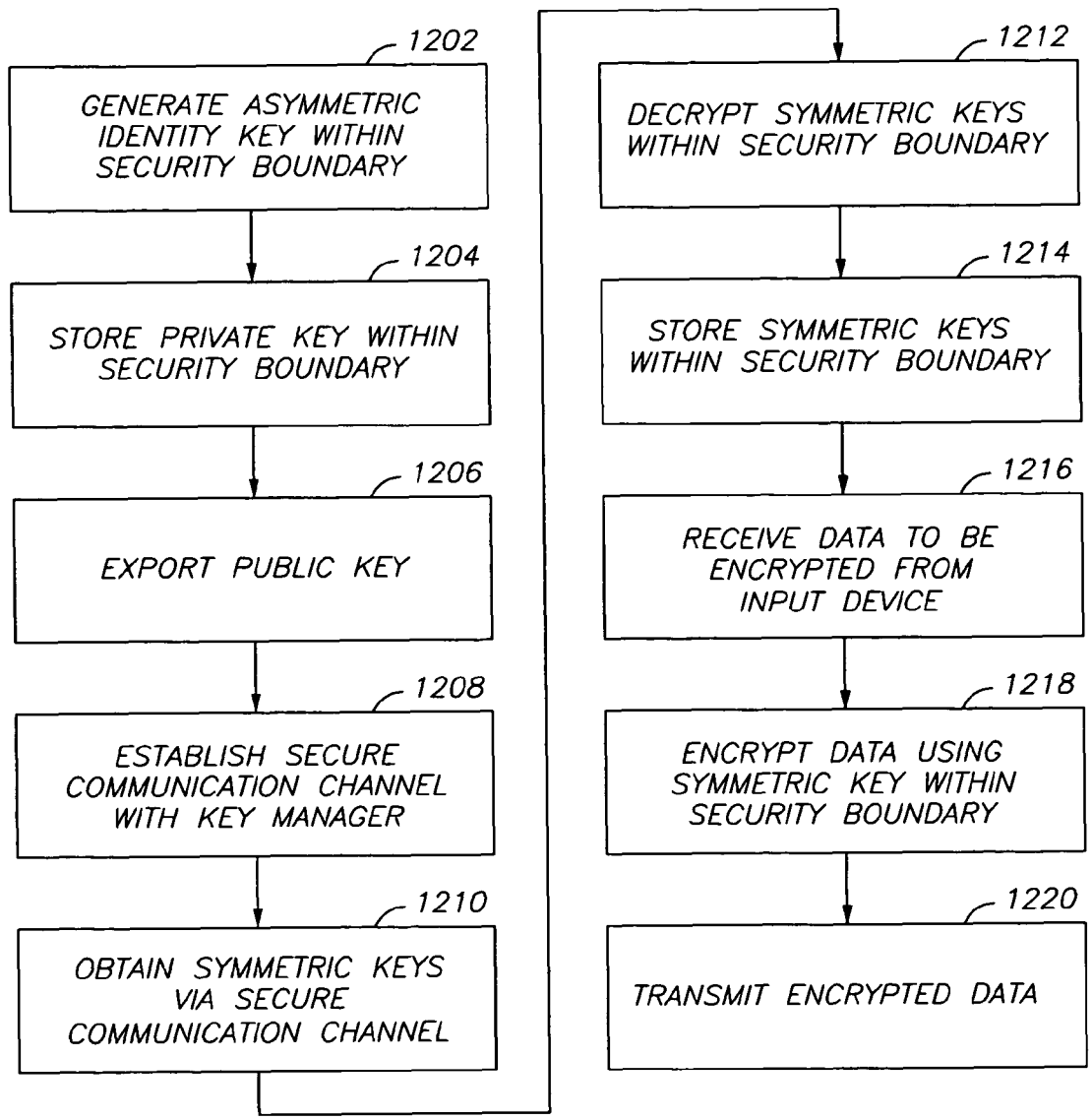
FIG. 12 is a flow chart of one embodiment of operations that may be performed in accordance with the invention.

Referring now to FIG. 12, an example of operations that may be performed by one embodiment of a stateless secure link module will be discussed. As represented by blocks 1202-1208, a stateless secure link module generates a public-private key pair, stores the private (e.g., identity) key in non-volatile memory within the security boundary, exports the public key and establishes a secure communication channel with, for example, a key manager.

As represented by block 1210 the key manager may send symmetric keys to the stateless secure link module via the secure communication channel. For example, the key manager may send symmetric keys that are used to encrypt and/or sign data that the stateless secure link module receives from an input device. The cryptographic processors may then decrypt these keys (block 1212) and store the decrypted keys (block 1214) within the security boundary associated with the stateless secure link module.

As represented by block 1216, the stateless module may receive data to be encrypted from an input device. As discussed above the input device may be, for example, a biometric sensor, a sensor for a camera, etc. or any other device that needs data to be authenticated or securely transmitted to another (e.g., remote) device.

As represented by blocks 1218, the stateless module uses the symmetric keys within the security boundary to encrypt the data. Then, as represented by block 1220, the stateless module sends the encrypted data to the remote device.

Additional details of security modules are disclosed, for example, in commonly-owned U.S. patent application Ser. No. 11/159,669, filed Jun. 21, 2005, entitled STATELESS HARDWARE SECURITY MODULE, the disclosure of which is hereby incorporated by reference herein.

It should be appreciated that the various components and features described herein may be incorporated in a system independently of the other components and features. For example, a system incorporating the teachings herein may include various combinations of these components and features. Thus, not all of the components and features described herein may be employed in every such system.

Different embodiments of the invention may include a variety of hardware and software processing components. In some embodiments of the invention, hardware components such as controllers, state machines and/or logic are used in a system constructed in accordance with the invention. In some embodiments of the invention, code such as software or firmware executing on one or more processing devices may be used to implement one or more of the described operations.

Such components may be implemented on one or more integrated circuits. For example, in some embodiments several of these components may be combined within a single integrated circuit. In some embodiments some of the components may be implemented as a single integrated circuit. In some embodiments some components may be implemented as several integrated circuits.

The components and functions described herein may be connected/coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards.

In some embodiments some of the connections represented by the lead lines in the drawings may comprise a data network, for example, a local network and/or a wide area network (e.g., the Internet).

The signals discussed herein may take several forms. For example, in some embodiments a signal may be an electrical signal transmitted over a wire, light pulses transmitted through the air or over an optical fiber or electromagnetic (e.g., RF or infrared) radiation transmitted through the air.

A signal may comprise more than one signal. For example, a signal may consist of a series of signals. Also, a differential signal comprises two complementary signals or some other combination of signals. In addition, a group of signals may be collectively referred to herein as a signal.

Signals as discussed herein also may take the form of data. For example, in some embodiments an application program may send a signal to another application program. Such a signal may be stored in a data memory.

A wide variety of devices may be used to implement the data memories discussed herein. For example, a data memory may comprise Flash memory, one-time-programmable (OTP) memory or other types of data storage devices.

The components and functions described herein may be connected/coupled directly or indirectly. Thus, in some embodiments there may or may not be intervening devices (e.g., buffers) between connected/coupled components.

In summary, the invention described herein generally relates to an improved authentication system and method. While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A method for building a first ad hoc network including a plurality of access devices, comprising:

receiving, at an access server configured to establish secure communications between the access server and access devices, first data from a first access device, wherein the first data includes a first credential;

verifying that the first credential is enrolled with the access server;

sending a cryptographic key corresponding to the first credential to the first access device;

receiving, at the access server, a second data from a second access device, wherein the second data includes the first credential;

verifying that the first credential is enrolled with the access server; and sending, from the access server, the cryptographic key associated with the first credential to the second access device, wherein the first access device and the second access device join the first ad hoc network using the cryptographic key, and wherein the first ad hoc network is cryptographically separate from a second ad hoc network including access devices authenticated to the access server using a second credential.

2. The method of claim 1, further comprising:
enrolling the first credential at the access server; and
associating the first credential with the cryptographic key.

3. The method of claim 2, further comprising cryptographically signing the first credential.

4. The method of claim 3, further comprising using a digital certificate to authenticate the signed first credential.

5. The method of claim 1, further comprising using a digital certificate to verify security functionality associated with the first access device.

6. The method of claim 2, further comprising using a digital certificate to verify proximity of a user to the first access device.

7. The method of claim 1, wherein the verifying comprises comparing the first credential with an enrolled credential.

8. The method of claim 1, wherein a second cryptographic key, associated with the second credential and sent to the first access device by the access server, enables the first access device to connect to the second ad hoc network including access devices corresponding to the second credential.

9. The method of claim 1, further comprising binding the first access device and the second access device using the first credential.

10. The method of claim 1, further comprising:
establishing the first ad hoc network based on the first credential.

11. The method of claim 1, wherein the first ad hoc network only includes devices joining the first ad hoc network using the cryptographic key.

12. The method of claim 1, wherein the first credential contains biometric information.

13. The method of claim 12, wherein the first credential contains fingerprint information identifying a user of the first access device.

14. The method of claim 1, wherein the first data includes information from a signal identifying a wireless proximity token, and wherein the information includes the first credential.

15. The method of claim 1, wherein the first access device includes a wireless proximity token reader.

16. A method for building a first ad hoc network, including a first set of access devices, in a plurality of ad hoc networks comprising:
receiving, at an access server configured to establish secure communications between the access server and access devices, data sent from the first set of access devices, wherein the data sent from each access device in the first set of access devices includes a first credential;
verifying that the first credential is enrolled with the access server; and
sending, to each access device in the first set of access devices, a unique cryptographic key corresponding to the first credential sent by each access device, wherein the cryptographic key enables each access device in the first set of access devices to join, using the cryptographic key, the first ad hoc network including access devices corresponding to the first credential, and wherein the first ad hoc network is cryptographically separate from a second ad hoc network including access devices authenticated to the access server using a second credential sent to the access server from a second set of access devices.

17. The method of claim 16, further comprising enrolling the first credential at the access server, wherein the first credential is associated with a specific user, and wherein the enrolling comprises associating the first credential with the cryptographic key.

18. The method of claim 16, further comprising cryptographically signing the first credential.

19. The method of claim 18, further comprising using a digital certificate to authenticate the signed first credential.

20. The method of claim 16, further comprising binding each access device in each network of access devices.

21. A method for building a plurality of ad hoc networks comprising:
receiving, at an access server configured to establish secure communications between the access server and access devices, first data, including a first credential, sent from a first plurality of access devices;
verifying the first credential is enrolled with the access server;
sending from the access server, to each access device in the first plurality of access devices, a first cryptographic key corresponding to the first credential, wherein the first cryptographic key enables each access device in the first plurality of access devices to join, using the first cryptographic key, a first ad hoc network including access devices corresponding to the first credential;
receiving second data, including a second credential, sent from a second plurality of access devices;
verifying the second credential is enrolled with the access server; and
sending from the access server, to each access device in the second plurality of access devices, a second cryptographic key corresponding to the second credential, wherein the second cryptographic key enables each access device in the second plurality of access devices to join, using the second cryptographic key, a second ad hoc network that is cryptographically separate from the first ad hoc network.

22. The method of claim 21, wherein the first ad hoc network only includes devices joining the first ad hoc network using the first cryptographic key.

* * * * *